APPARATUS FOR FILLING PLEATS IN UPHOLSTERY FABRIC

Filed Nov. 26, 1962 21 Sheets-Sheet 1

INVENTOR.
VICTOR T. FAHRINGER
BY
Hyde W. Ballard

APPARATUS FOR FILLING PLEATS IN UPHOLSTERY FABRIC

Filed Nov. 26, 1962 21 Sheets-Sheet 2

INVENTOR.
VICTOR T. FAHRINGER
BY
[signature]

Jan. 18, 1966 V. T. FAHRINGER 3,229,443

APPARATUS FOR FILLING PLEATS IN UPHOLSTERY FABRIC

Filed Nov. 26, 1962 21 Sheets-Sheet 3

INVENTOR.
VICTOR T. FAHRINGER

BY

Hyde W. Ballard

APPARATUS FOR FILLING PLEATS IN UPHOLSTERY FABRIC

Filed Nov. 26, 1962

INVENTOR.
VICTOR T. FAHRINGER
BY

Jan. 18, 1966 V. T. FAHRINGER 3,229,443

APPARATUS FOR FILLING PLEATS IN UPHOLSTERY FABRIC

Filed Nov. 26, 1962 21 Sheets-Sheet 5

INVENTOR.
VICTOR T. FAHRINGER

BY

Jan. 18, 1966 V. T. FAHRINGER 3,229,443

APPARATUS FOR FILLING PLEATS IN UPHOLSTERY FABRIC

Filed Nov. 26, 1962 21 Sheets-Sheet 6

INVENTOR.
VICTOR T. FAHRINGER

BY

Hyde W. Ballard

APPARATUS FOR FILLING PLEATS IN UPHOLSTERY FABRIC

Filed Nov. 26, 1962 21 Sheets-Sheet 7

INVENTOR.
VICTOR T. FAHRINGER

BY

[signature]

APPARATUS FOR FILLING PLEATS IN UPHOLSTERY FABRIC

INVENTOR.
VICTOR T. FAHRINGER
BY
Hall W. Ballard

INVENTOR.
VICTOR T. FAHRINGER
BY
Hale W. Ballard

APPARATUS FOR FILLING PLEATS IN UPHOLSTERY FABRIC

Filed Nov. 26, 1962 21 Sheets-Sheet 10

INVENTOR.
VICTOR T. FAHRINGER
BY

APPARATUS FOR FILLING PLEATS IN UPHOLSTERY FABRIC

Filed Nov. 26, 1962 21 Sheets-Sheet 11

INVENTOR.
VICTOR T. FAHRINGER
BY
Hale W. Ballard

INVENTOR.
VICTOR T. FAHRINGER

BY

Hale W. Ballard

INVENTOR.
VICTOR T. FAHRINGER
BY

Jan. 18, 1966 V. T. FAHRINGER 3,229,443

APPARATUS FOR FILLING PLEATS IN UPHOLSTERY FABRIC

Filed Nov. 26, 1962 21 Sheets-Sheet 14

INVENTOR

VICTOR T. FAHRINGER

BY [signature]

Jan. 18, 1966 V. T. FAHRINGER 3,229,443

APPARATUS FOR FILLING PLEATS IN UPHOLSTERY FABRIC

Filed Nov. 26, 1962 21 Sheets-Sheet 15

INVENTOR.
VICTOR T. FAHRINGER
BY

Jan. 18, 1966 V. T. FAHRINGER 3,229,443

APPARATUS FOR FILLING PLEATS IN UPHOLSTERY FABRIC

Filed Nov. 26, 1962 21 Sheets-Sheet 16

INVENTOR.
VICTOR T. FAHRINGER

BY

Hale W. Ballard

APPARATUS FOR FILLING PLEATS IN UPHOLSTERY FABRIC

Filed Nov. 26, 1962 21 Sheets-Sheet 17

INVENTOR
VICTOR T. FAHRINGER

BY Hale W. Ballard

APPARATUS FOR FILLING PLEATS IN UPHOLSTERY FABRIC

Filed Nov. 26, 1962 21 Sheets-Sheet 18

INVENTOR
VICTOR T. FAHRINGER
BY

INVENTOR.
VICTOR T. FAHRINGER
BY

APPARATUS FOR FILLING PLEATS IN UPHOLSTERY FABRIC

Filed Nov. 26, 1962

INVENTOR.
VICTOR T FAHRINGER
BY

APPARATUS FOR FILLING PLEATS IN UPHOLSTERY FABRIC

Filed Nov. 26, 1962

INVENTOR.
VICTOR T. FAHRINGER
BY

United States Patent Office 3,229,443
Patented Jan. 18, 1966

3,229,443
APPARATUS FOR FILLING PLEATS IN UPHOLSTERY FABRIC

Victor T. Fahringer, Clarksville, Va., assignor to Burlington Industries, Inc., Greensboro, N.C., a corporation of Delaware Filed Nov. 26, 1962, Ser. No. 239,931
33 Claims. (Cl. 53—59)

This invention relates to apparatus for producing a pleated upholstery fabric of the type widely used for covering vehicle seats. More particularly, the invention pertains to an improved automatic machine for inserting strips of felt in preformed pockets or pleats in an upholstery fabric.

Several devices have been developed for inserting the stuffer or filling into the pleats of an upholstery type fabric to form padded ridges or raised surfaces. Such devices have employed needles or shuttles insertable into the pleats and, in some cases, a shuttle which travels in a non-reversing path entirely through the pleat or pocket. These prior machines have been cumbersome and extremely slow, plus the fact that none was completely automatic.

The present invention is directed to an improved and refined automatic machine for removing a single strip of stuffing material such as felt from a storage supply, inserting this strip into and through a pleat in the preformed fabric and retaining the stuffing in the pleat during withdrawal of a shuttle element. The machine automatically advances the fabric across a platform and registers the next pleat with the stuffing shuttle. Suitable automatic and control circuits are supplied to sequentially actuate the various parts of the mechanism such as the clamps, registering devices, and the edge control mechanism. The machine is completely automatic in operation. The only manual attention needed is to replenish the storage reservoir with stuffing strips.

A primary object of the invention, therefore, is to provide apparatus for automatically stuffing the pleats of an upholstery fabric without the necessity for manual manipulation by an operator.

A further object of the invention is to provide, in a machine of the type described, an improved shuttle actuating device for guiding the stuffing strips into the fabric pleats.

A further object of the invention is to provide improved mechanism for storing and delivering strips of stuffing material to a stuffing shuttle for insertion into the pleats of an upholstery fabric.

A further object of the invention is to provide improved mechanism, in a machine of the type described, for clamping and retaining the stuffing material in the pleat.

A further object of the invention is to provide improved circuitry for controlling the automatic features of the stuffing machine.

Further objects will be apparent from the specification and drawings in which

Figure 1:
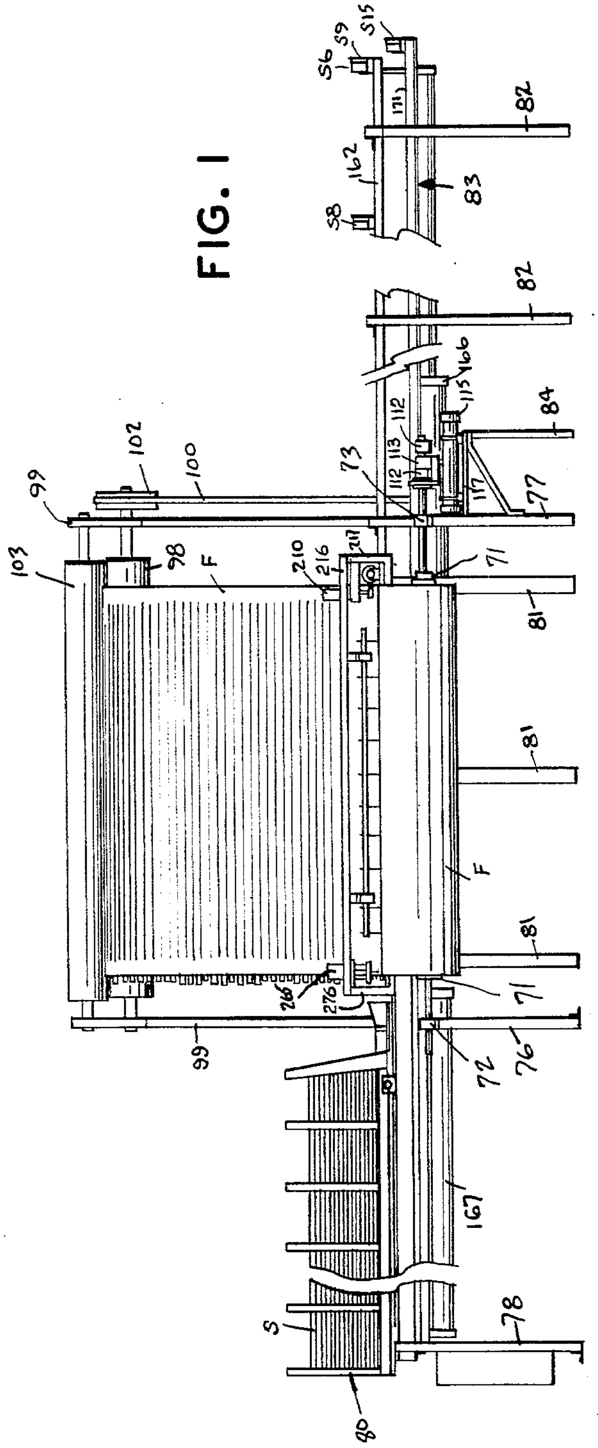
FIG. 1 is a front view of my improved upholstery stuffing machine.
Figures 2, 4:
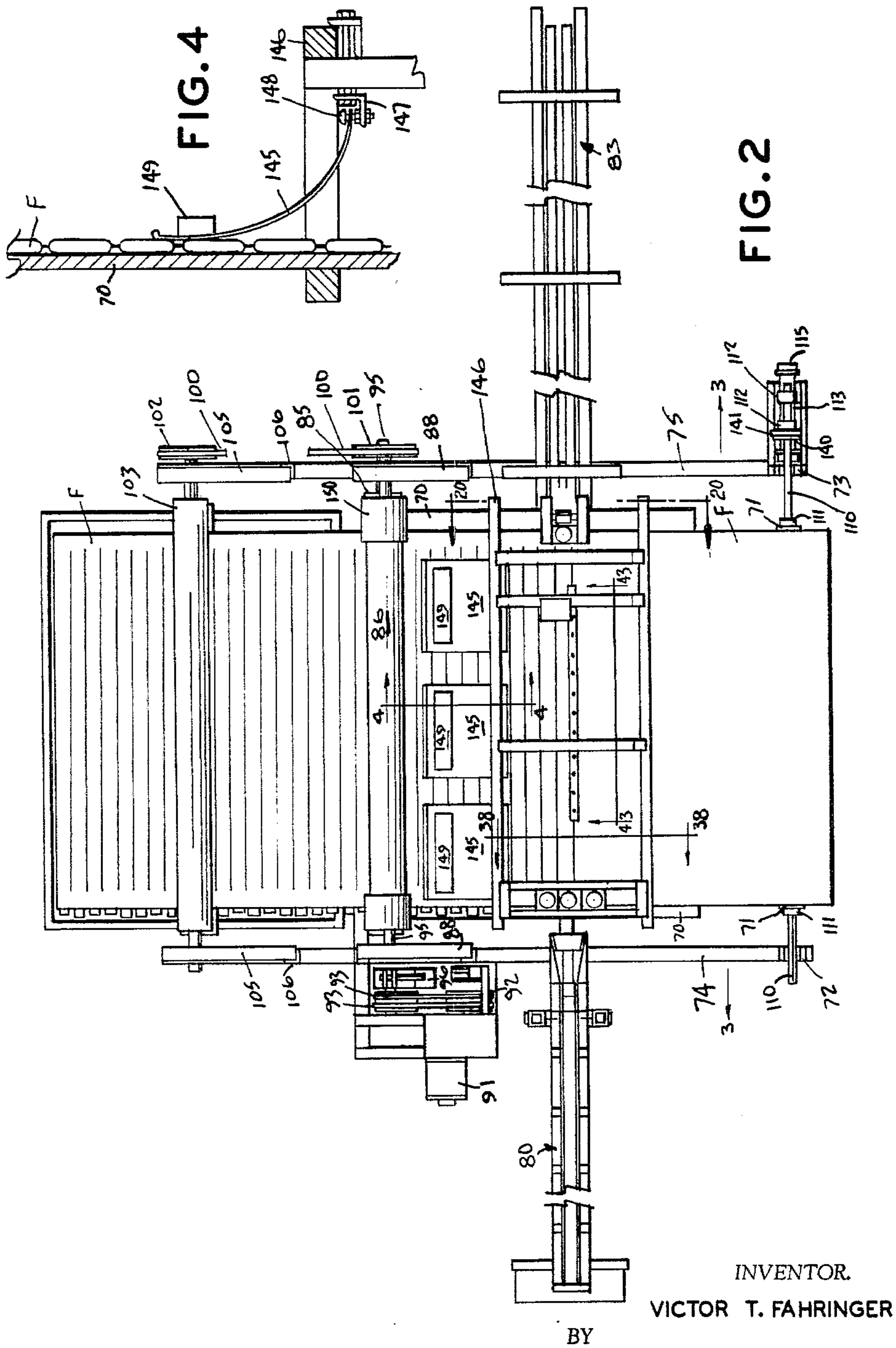
FIG. 2 is a top view of the machine shown in FIG. 1.
FIG. 4 is an enlarged sectional detail as seen at 4—4 of FIG. 2.
Figures 7, 27:
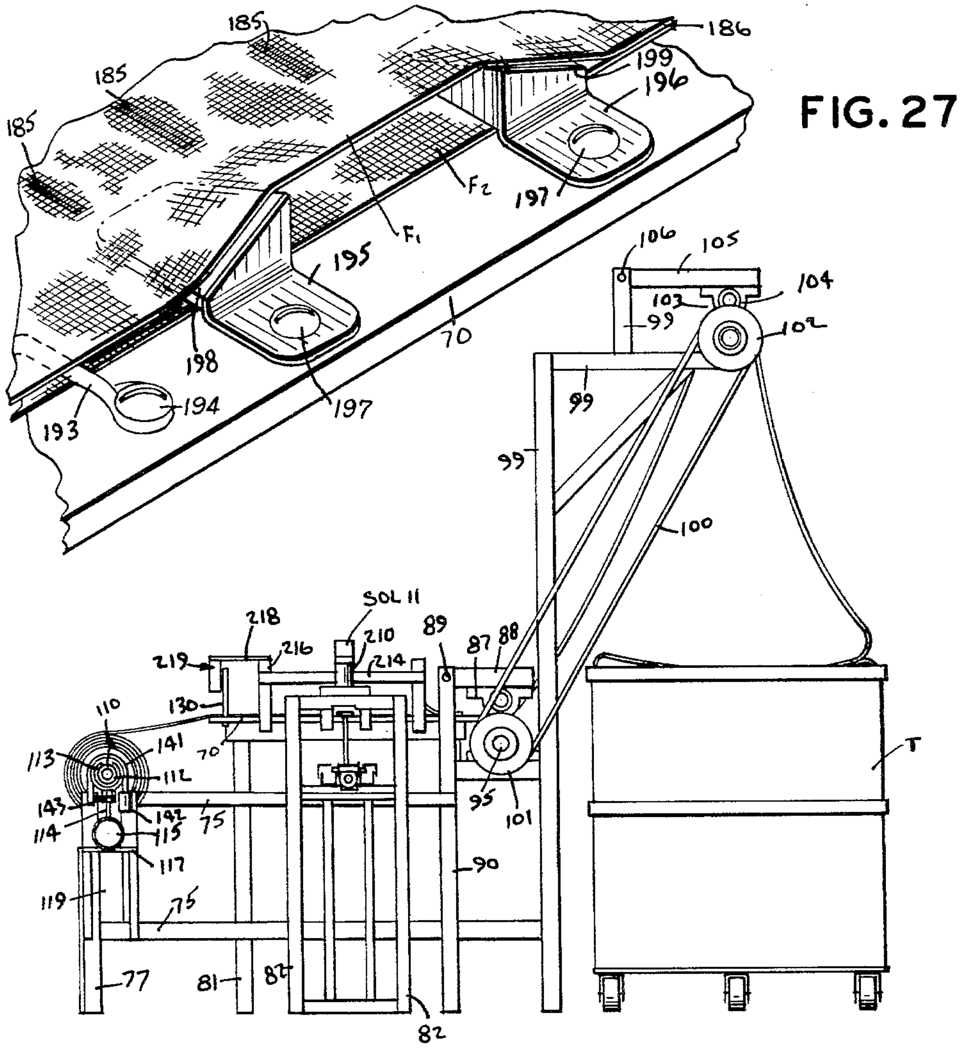
FIG. 7 is an opposite side view of the entire machine as seen in FIG. 2.
Figure 28:
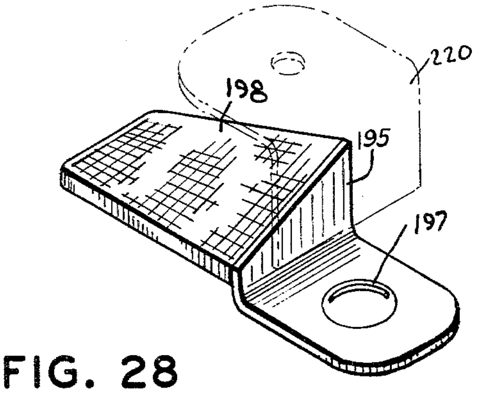
Figure 8:
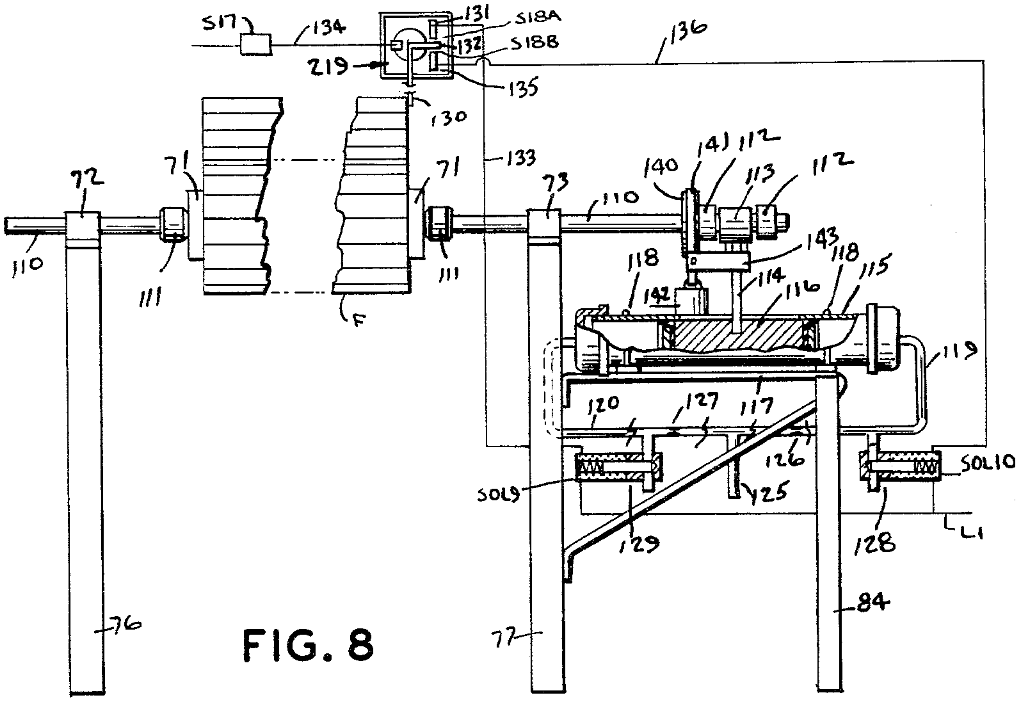
Figure 9:
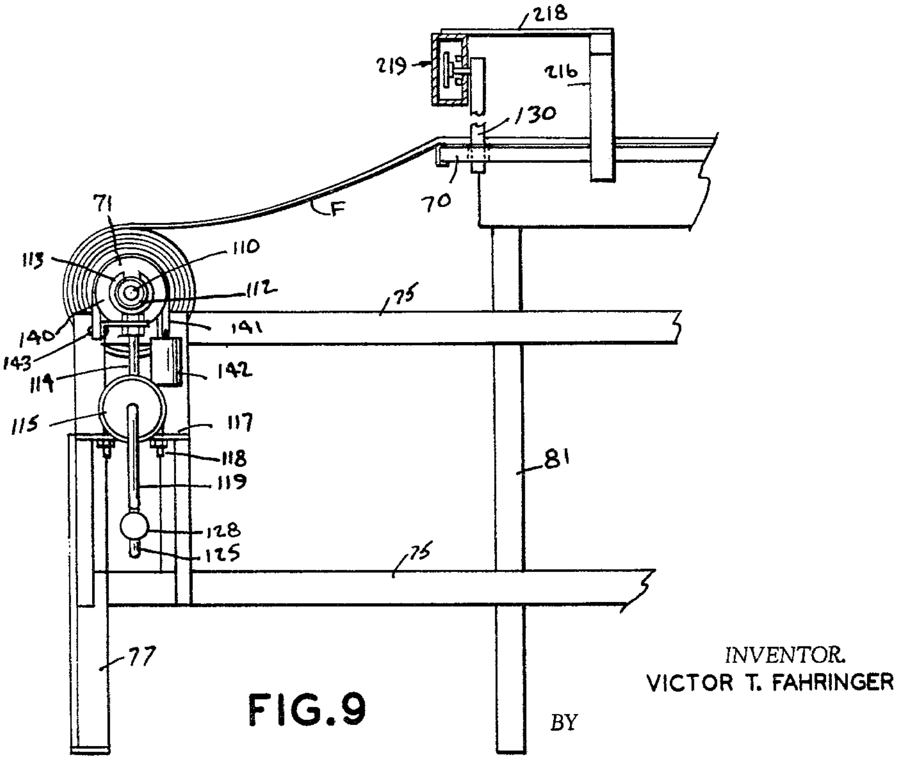
Figure 10:
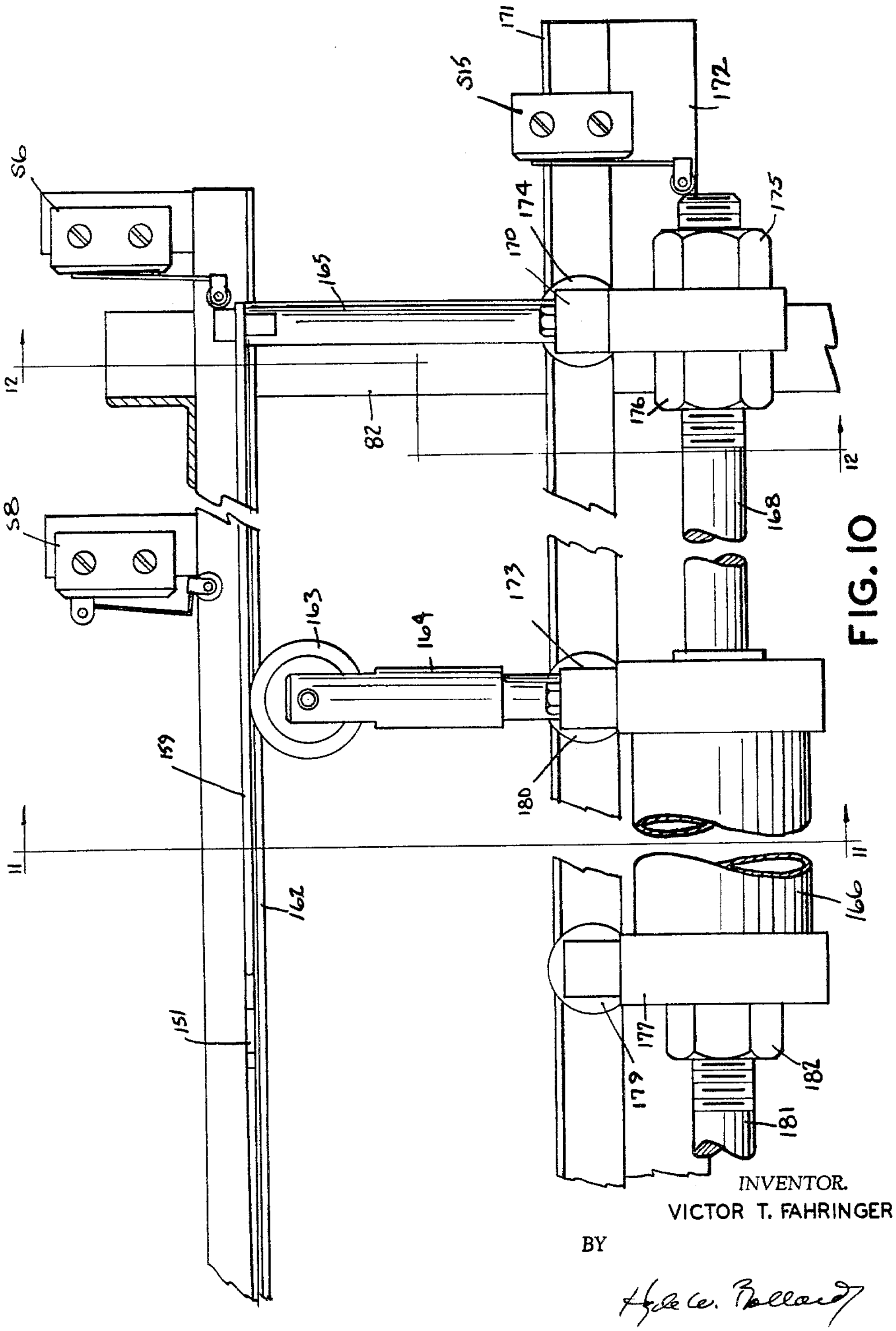
Figures 11, 12:
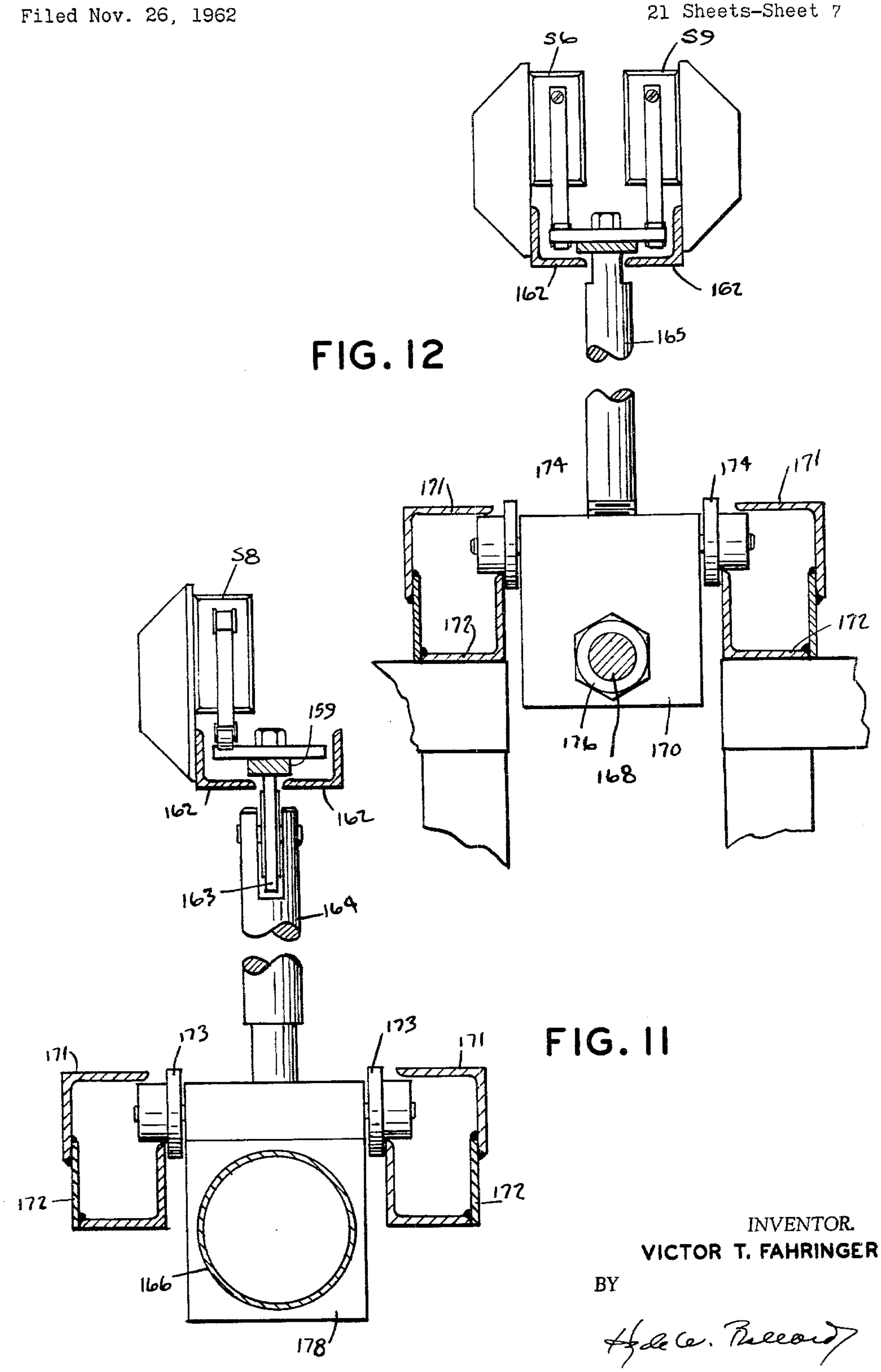
Figures 13, 14, 15, 16, 17, 18, 19:
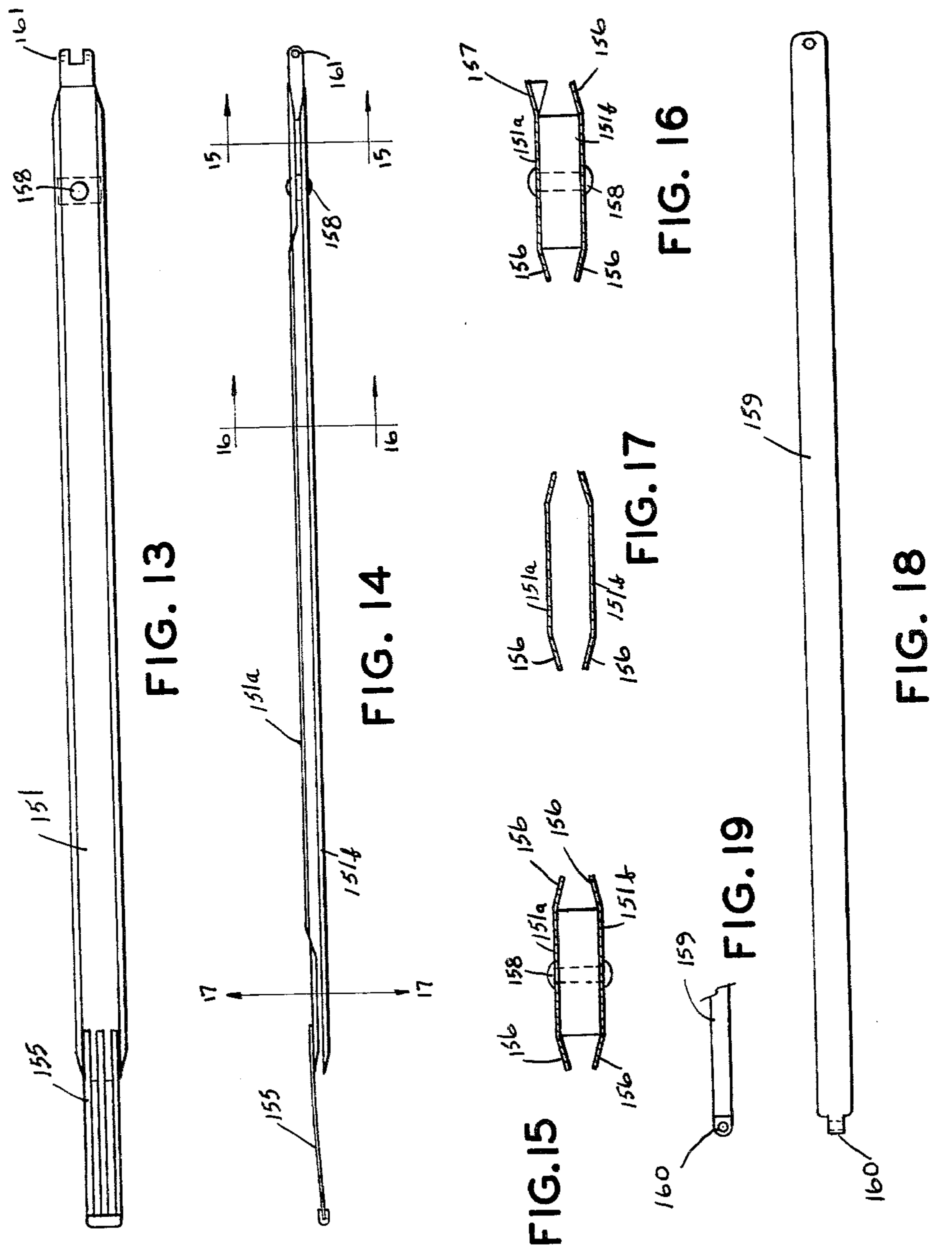
Figure 20:
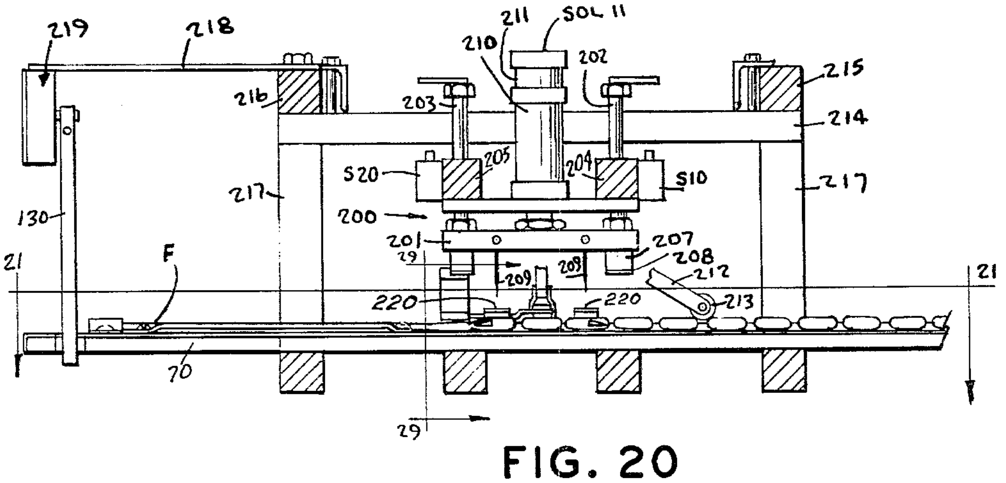
Figure 21:
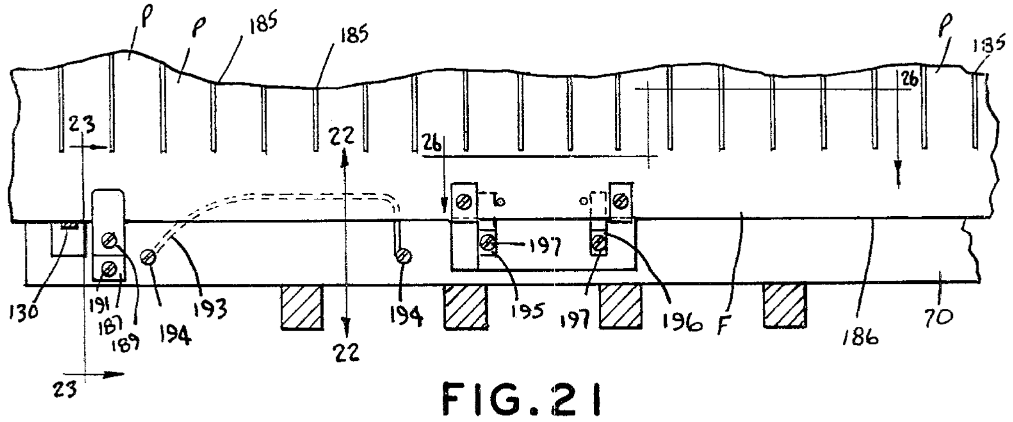
Figure 22:
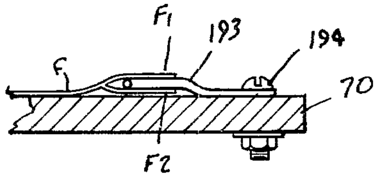
Figure 23:
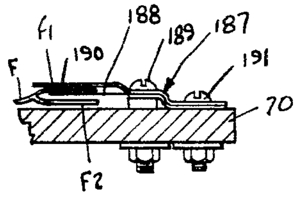
Figure 24:
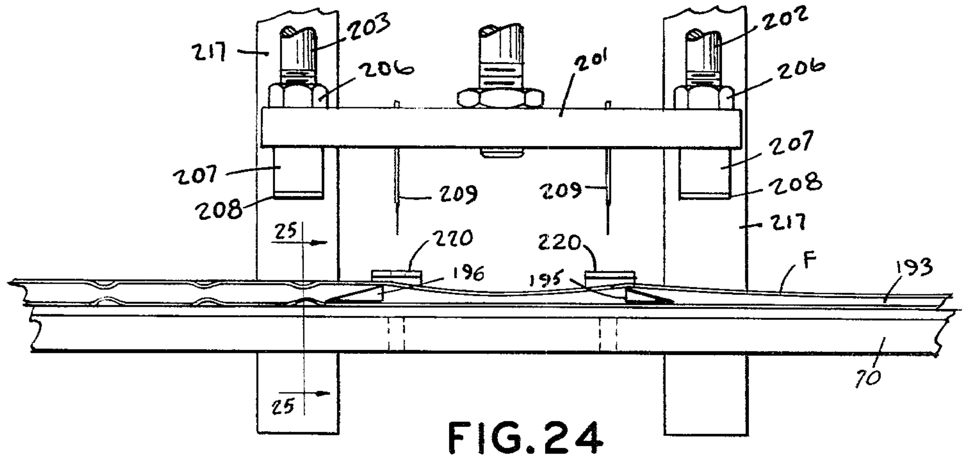
Figure 25:
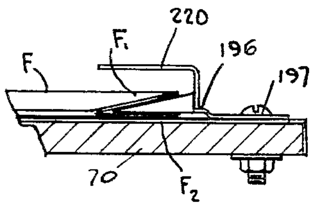
Figure 26:
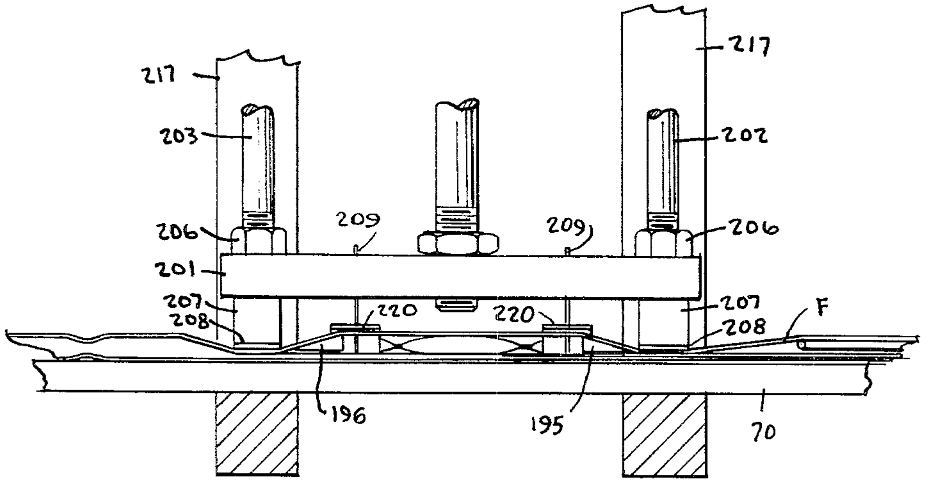
Figure 29:
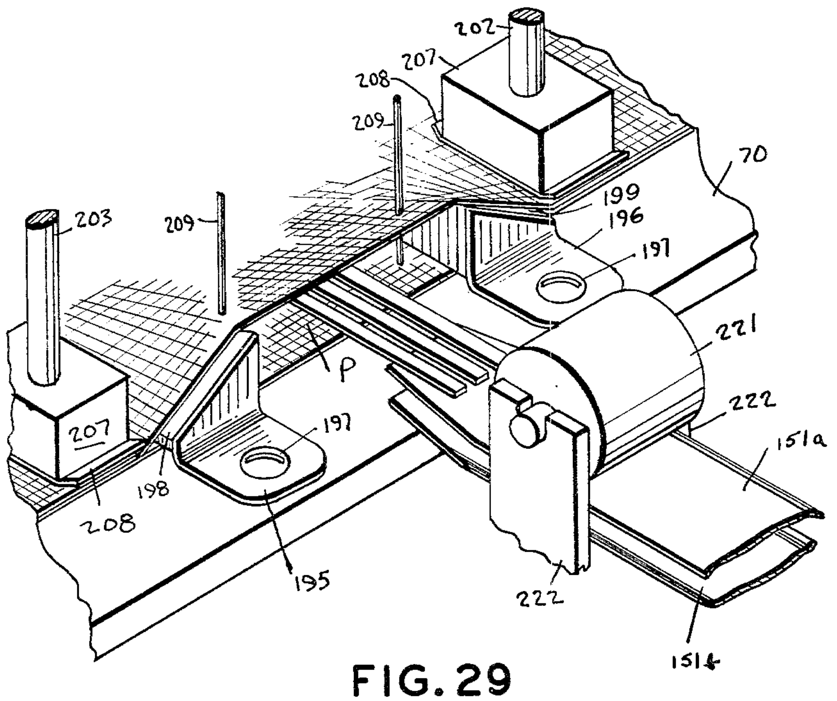
Figures 30, 31, 32, 33:
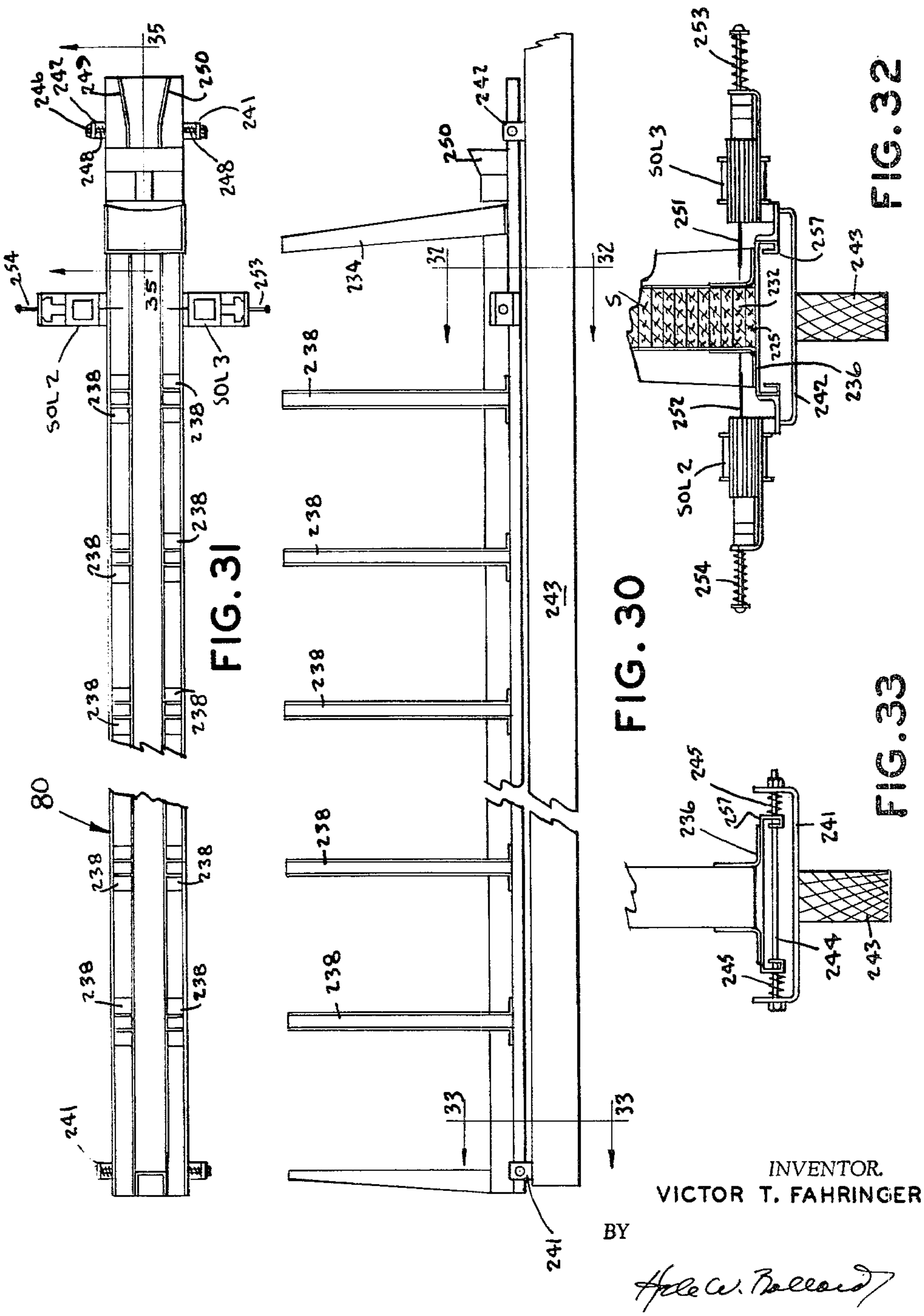
Figures 34, 35, 36, 37:
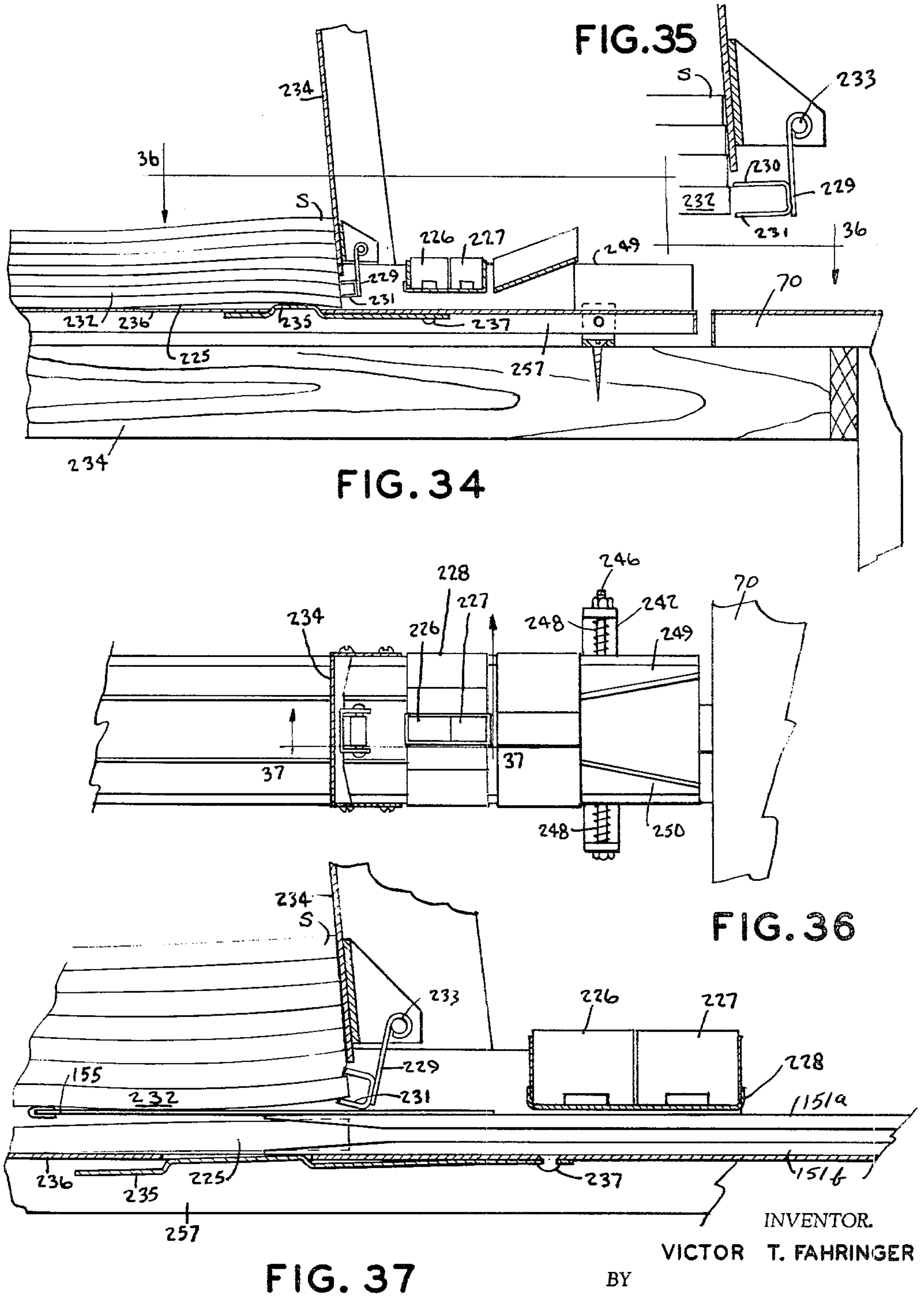
Figure 38:
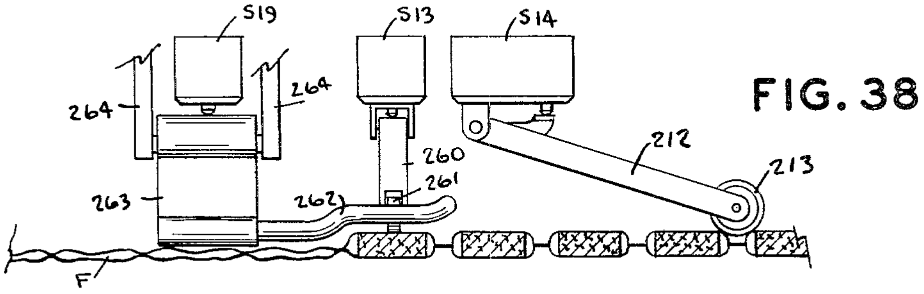
Figure 39:
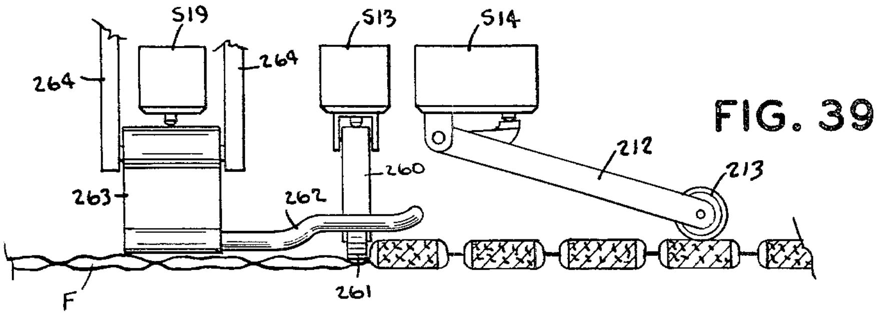
Figure 40:
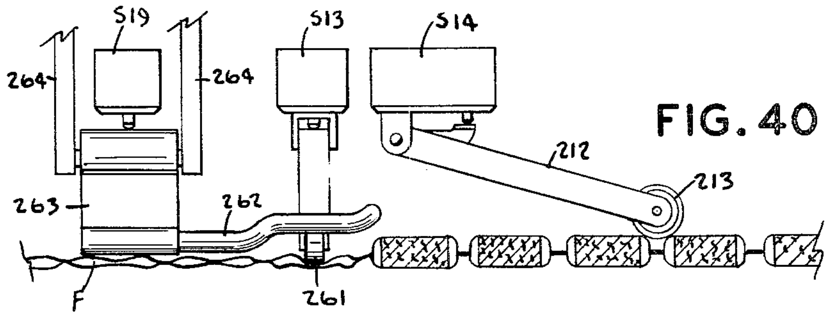
Figure 41:
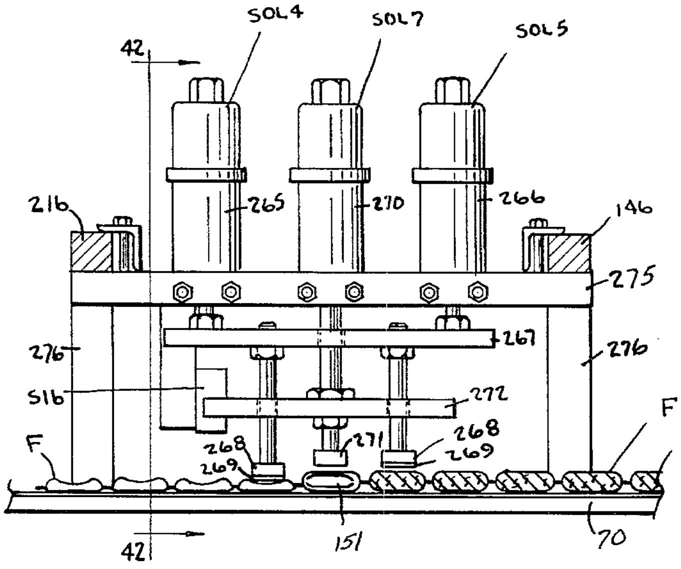
Figure 42:
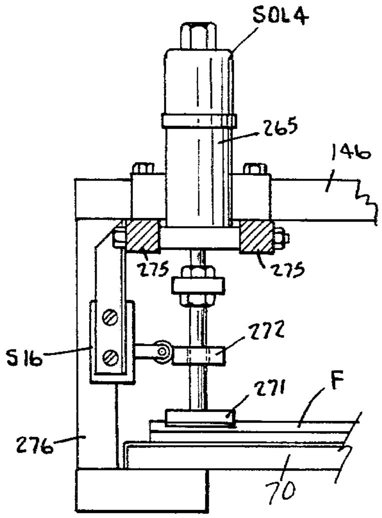
Figure 43:
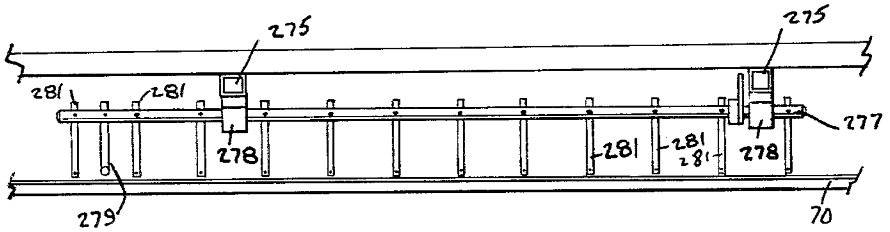
Figure 44:
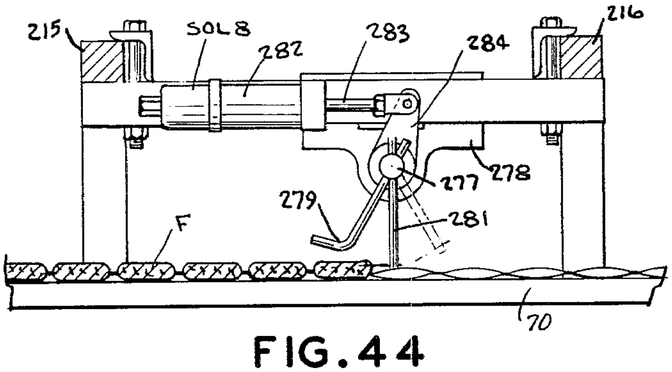
Figure 45:
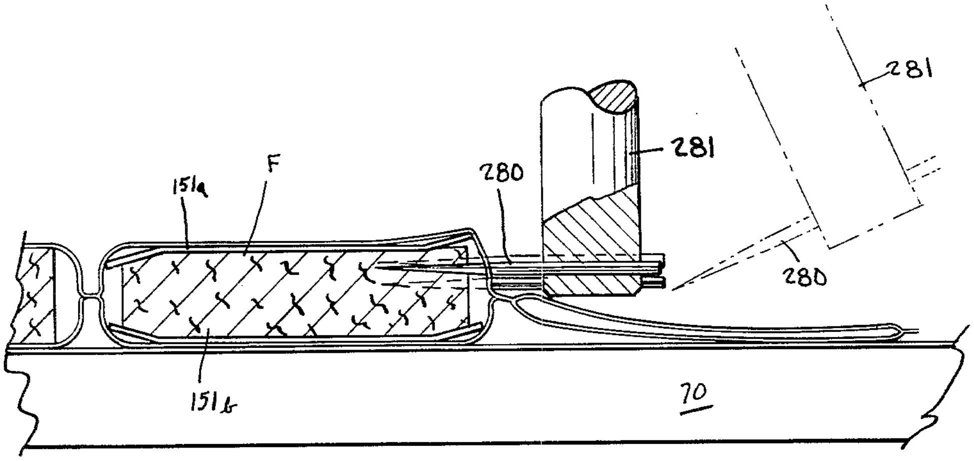
Figure 54:
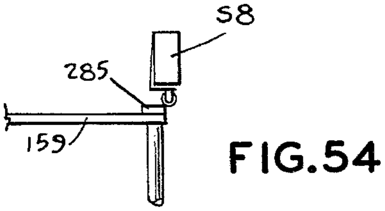
Figure 60:
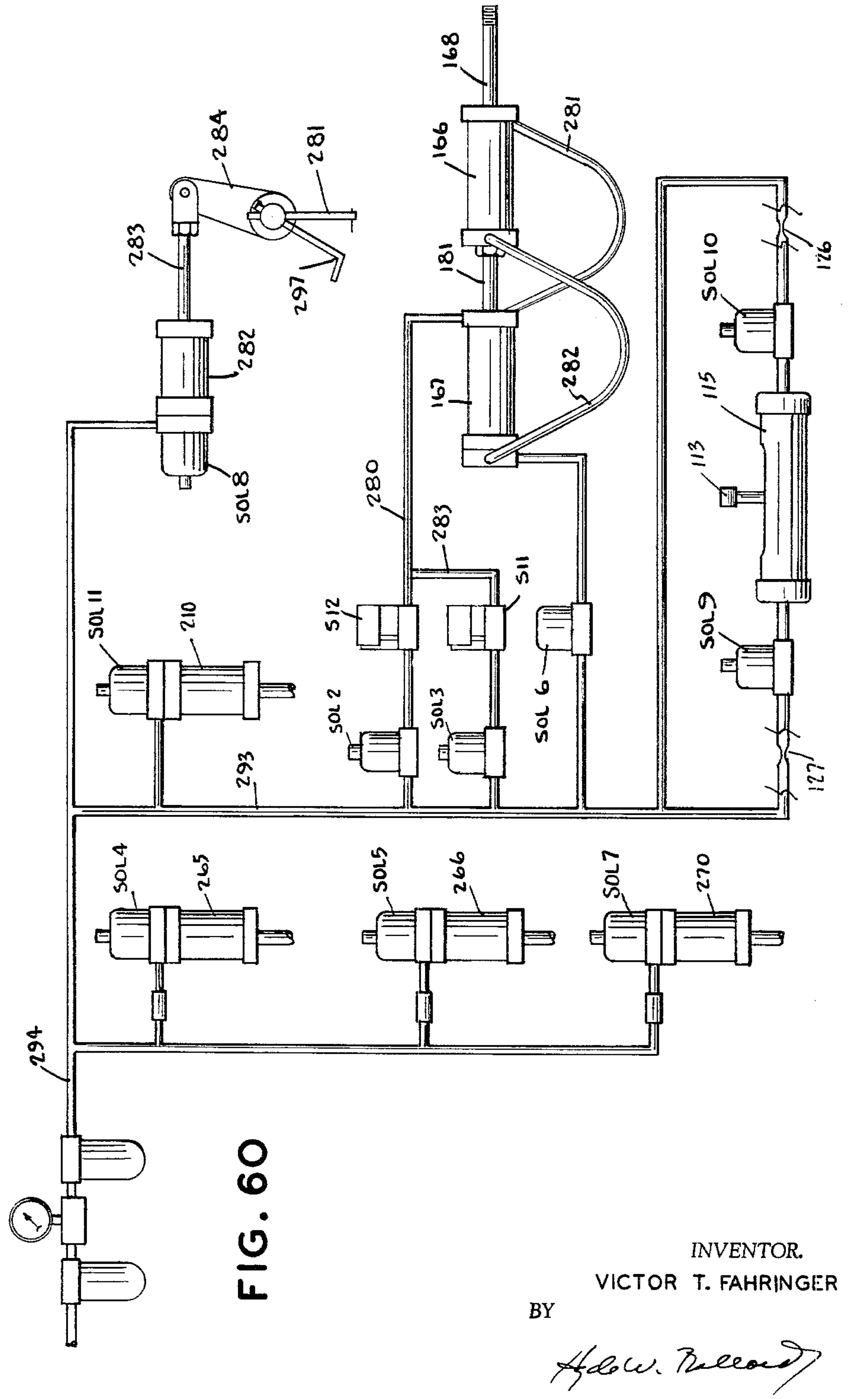
Figure 61:
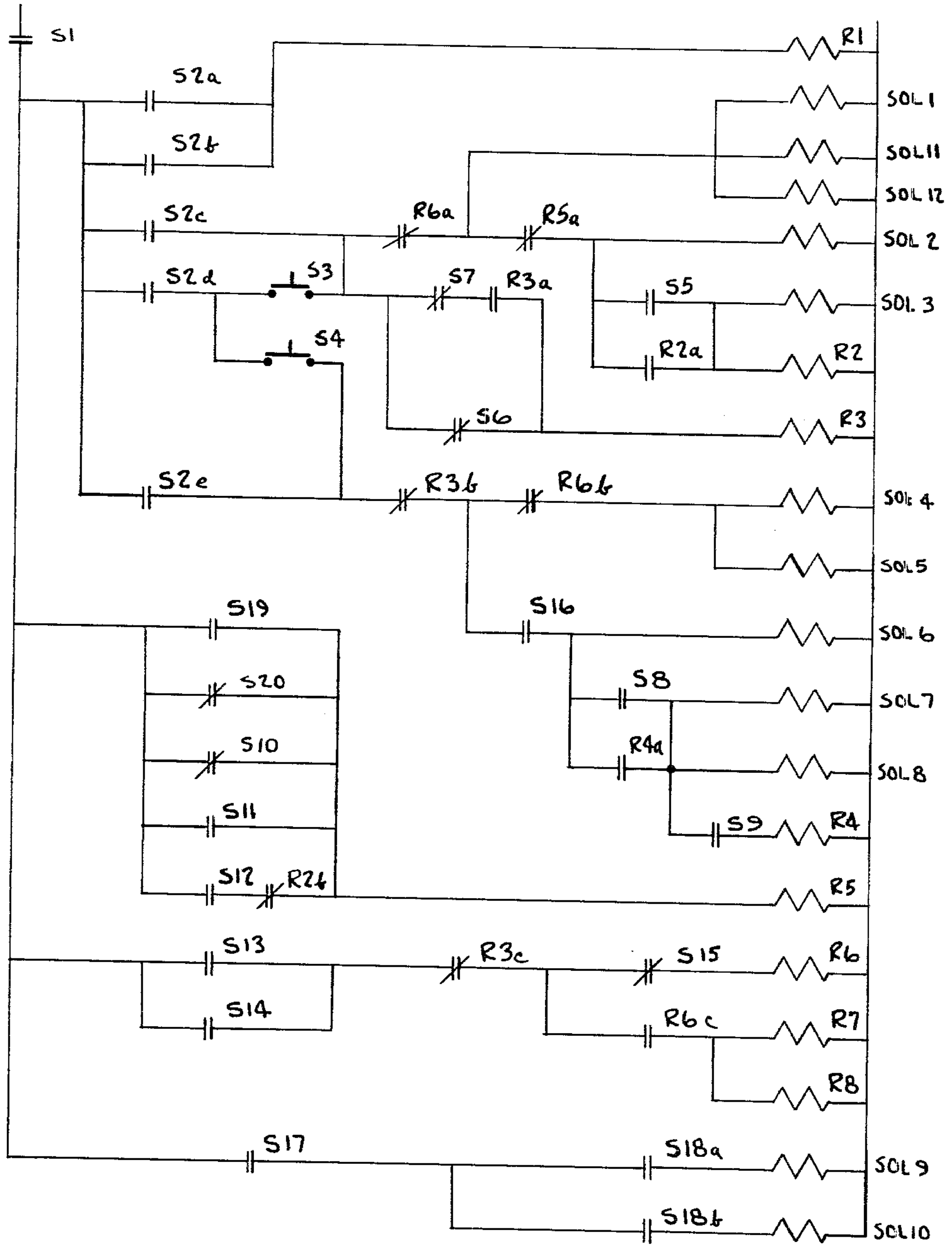
Figure 62:
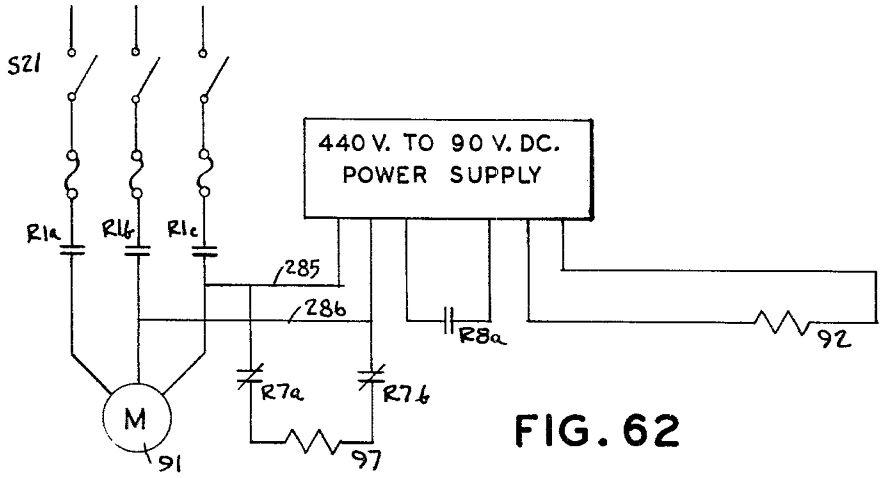
Figure 63:
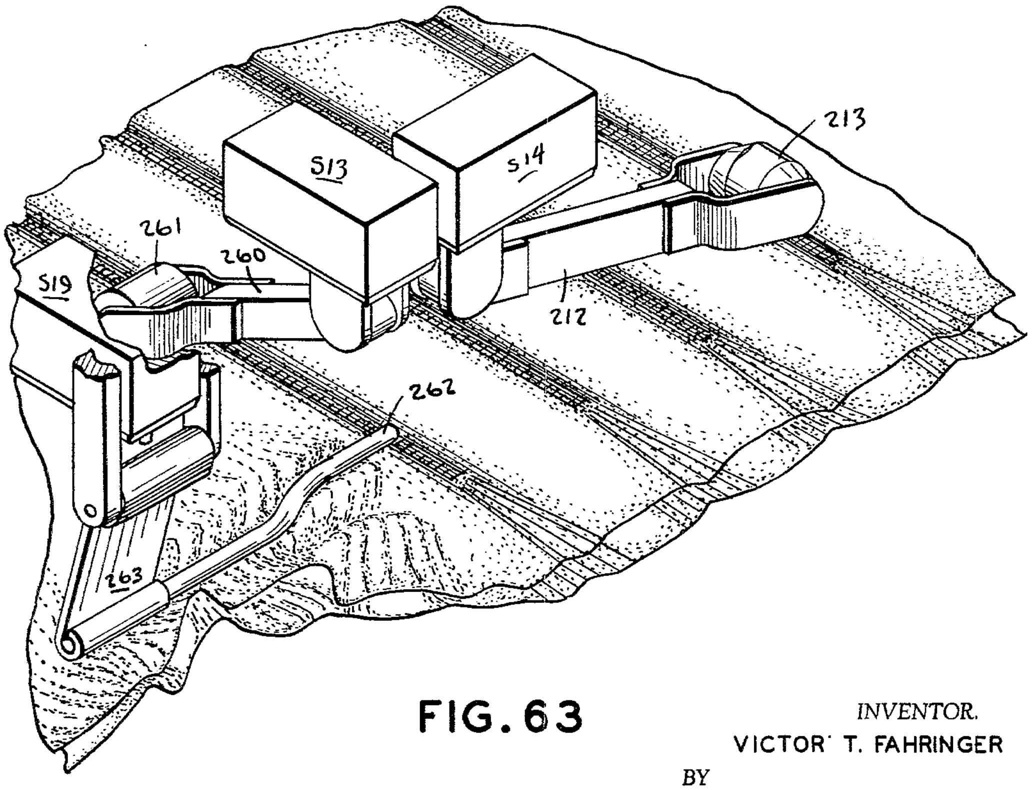

FIG. 8 is an enlarged fragmentary detail, partly sectioned, of a portion of the apparatus of FIG. 1 illustrating the edge control mechanism, FIG. 9 is a side view of the structure of FIG. 8, FIG. 10 is an enlarged sectional detail of the right-hand portion of the shuttle track and guide of FIG. 1, FIG. 11 is a sectional detail as seen at 11—11 of FIG. 10, FIG. 12 is a sectional detail as seen at 12—12 of FIG. 10, FIG. 13 is a top view of the shuttle which carries the felt strip into the pleat, FIG. 14 is a side view of the shuttle of FIG. 13, FIGS. 15–17 are enlarged cross sections of FIG. 14 as seen at 15—15, 16—16, and 17—17 respectively, FIG. 18 is a top view of the shuttle bar which connects the shuttle to the shuttle actuating mechanism, FIG. 19 is a detail showing a side view of a portion of the shuttle bar of FIG. 18, FIG. 20 is an enlarged sectional detail of the clamping assembly for shuttle insertion as seen at 20—20 of FIG. 2, FIG. 21 is a section seen at 21—21 of FIG. 20, FIG. 22 is an enlarged sectional detail as seen at 22—22 of FIG. 21, FIG. 23 is an enlarged sectional detail as seen at 23—23 of FIG. 21, FIG. 24 is an enlarged detail showing the clamping assembly of FIG. 20 just prior to actuation, FIG. 25 is a fragmentary section as seen at 25—25 of FIG. 24, FIG. 26 shows the structure of FIG. 24 in the clamping position, FIG. 27 is a fragmentary perspective showing the openers of FIGS. 24 and 26 presenting the selvage of the fabric in position for reception of the shuttle, FIG. 28 is a perspective showing one of the openers of FIG. 27, FIG. 29 is a perspective with portions broken away, illustrating the opened fabric selvage and the insertion of the shuttle, FIG. 30 is an enlarged detail of the felt strip magazine and dispensing mechanism, FIG. 31 is a top view of the structure of FIG. 30, FIG. 32 is an enlarged section as seen at 32—32 of FIG. 30, FIG. 33 is an enlarged section as seen at 33—33 of FIG. 30, FIG. 34 is an enlarged detail of the felt magazine, FIG. 35 is an enlarged detail of the stripper cam, FIG. 36 is a top view of the structure of FIG. 34 as seen at 36—36, FIG. 37 is a section as seen at 37—37 of FIG. 36, FIGS. 38–40 are schematic views showing the relative cooperation and positioning of the sensing elements at the shuttle entering side of the fabric, FIG. 41 is a sectional side view of the fabric and stuffer retaining clamps, as seen at 38—38 of FIG. 2, FIG. 42 is an end view of the clamps of FIG. 38, FIG. 43 is a view of the felt strip retaining bar as seen at 43—43 of FIG. 2, FIG. 44 is an end view, on an enlarged scale, of the structure of FIG. 43, FIG. 45 is an enlarged sectional detail showing one of the needles penetrating a filled pleat, FIGS. 46–53 show the relative positions of the shuttle, felt magazine needles, and associated switches during a cycle of operation, FIG. 54 is a fragmentary detail of one of the sensing switches for the shuttle, FIGS. 55–59 illustrate sequentially the positioning of the various hold-down clamps and the needle bar during a complete cycle of operation of the machine, FIG. 60 is a schematic diagram showing the pneumatic connections and actuating controls for the various elements, FIG. 61 is a circuit diagram, FIG. 62 is a circuit diagram for the main motor system, and FIG. 63 is a perspective partially broken away, showing the stop motion switch being actuated in the event of a malfunction.

The invention is characterized by the provision of means for intermittently feeding and anchoring a running length of material in proper position for the insertion of a bifurcated scabbard or shuttle through empty pleats or pockets formed in the material. The scabbard strips a length of felt or stuffing material from a stack in a magazine, draws the felt into the pleat, whereupon clamping and impaling means anchor the felt in the pocket while the scabbard is completely withdrawn. The material or fabric then advances to be indexed for the filling of the next pleat. The controls and sensing mechanism enable the stuffing operation to be completely automatic.

Figure 3:
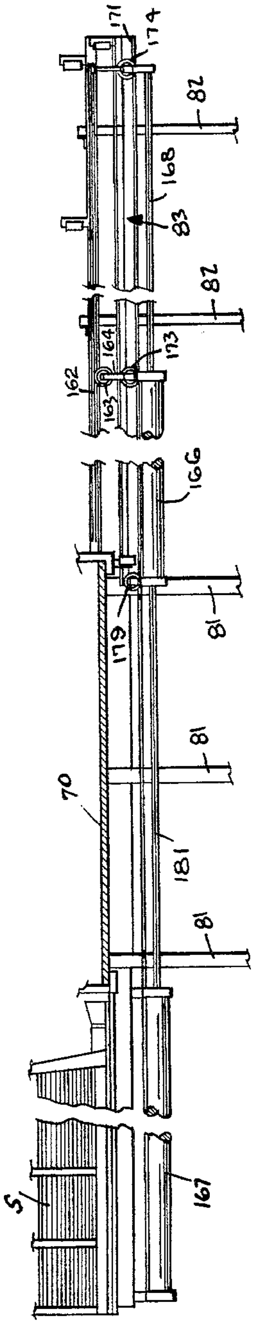
FIG. 3 is a view seen at 3—3 of a portion of the apparatus of FIG. 2.
Figures 5, 6:
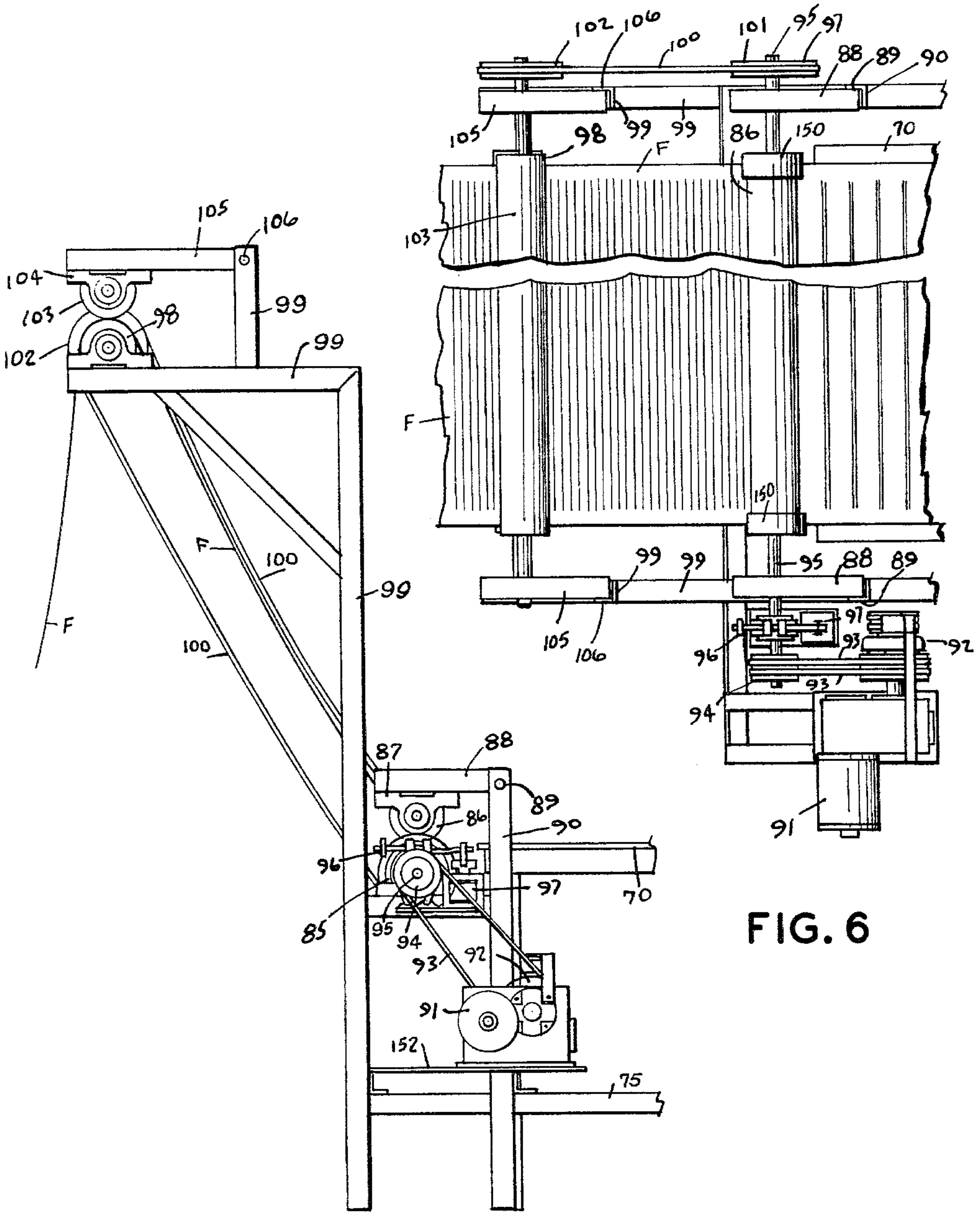
FIG. 5 is a side view of a portion of the stuffing machine of FIGS. 1 and 2.
FIG. 6 is a top view of the structure shown in FIG. 5.

Referring now to FIGURES 1–3, my improved pleat stuffing machine comprises a framework which supports a generally horizontal platform 70 across which the material or fabric F is fed. A beam 71 of prepleated fabric F is loosely journaled in U blocks 72 and 73, supported on horizontal frame members 74 and 75, which are tied in to legs 76 and 77. The framework also includes a plurality of standards or legs, one of which 78 supports the felt or stuffing strip magazine 80. Legs 81, 81 support platform 70 and standards 82, 82 support the shuttle track assembly 83. Various other legs such as 84, 84 support other parts of the apparatus. The fabric F is unrolled and advanced over the platform 70 under control of the nip of feed rollers 85 and 86 (see FIGS. 5 and 6). The fabric F is compressed against the driven roll 85 by the weight of a floating roll 86 which is journaled in pillow blocks 87, 87 mounted on arms 88, 88 pivoted at 89, 89 to frame members 90, 90. A motor 91 drives roller 85 through a clutch 92, belt 93, and pulley 94. The shaft 95 of roller 85 is provided with a quick acting brake 96 applied by a solenoid 97 for accurately stopping and indexing the fabric F on platform 70. After passing through the nip of rollers 85 and 86, the stuffed fabric is carried to an elevated position as shown in FIGS. 5 and 7 for conveniently packing into a truck T, and for this purpose, the fabric is carried over a driven roller 98 journaled on frame members 99, 99 and driven from the opposite end of shaft 95 through chain or belt 100 and sprockets or pulleys 101, 102 (FIGS. 6 and 7). Nip pressure is applied to the fabric passing over roller 98 by means of a floating pressure roll 103 journaled in bearings 104, 104 mounted on floating arms 105, 105, pivoted at 106, 106.

*Fabric feed mechanism*

It is of considerable importance to maintain the righthand edge of the fabric F in accurate lateral alignment with the selvage opening mechanism to insure proper registry and entry of the shuttle. For this purpose, I have found that a very effective edge control device can be applied by means of a floating piston acting under the influence of balanced fluid pressure in opposite ends of a cylinder. Referring particularly to FIGS. 8 and 9, the beam 71, from which fabric F is supplied, is rigidly secured to shaft 110 and retained thereon axially by means of collars 111, 111. The shaft 110 is rotatable and slidable in the U brackets 72 and 73, supported on horizontal frame members 74 and 75 as well as vertical legs 76, 77. The outboard end of shaft 110 is provided with two adjustable collars 112, 112 which straddle a yoke 113 adjustably secured to a vertical piston rod 114 which extends through a slot in cylinder 115 and is rigidly fixed to a piston 116. Cylinder 115 is secured to a platform 117 by means of clamps 118, 118 and is provided with a righthand fluid connection 119 and a lefthand fluid connection 120. The high pressure fluid supply line 125 is connected to a suitable source of high pressure fluid such as air at one end. The other end connects to lines 119 and 120 through a restriction or orifice in each line 126 and 127. An electrically operated solenoid bleed valve 128 is connected in line 119 between cylinder 115 and orifice 126. Similarly, an electrical solenoid actuated valve 129 is connected in line 120 between orifice 127 and cylinder 115. As long as the air pressure at each end of the piston 116 is balanced, the piston and beam 71 will run in a central or mid position. However, should the edge of the fabric F travel too far to the right, as seen in FIG. 8, it will displace sensing finger 130 to make an electrical contact between a contact 131 and a pivoting arm 132 on the other end of finger 130, which in turn completes an electrical circuit between line 133 and line 134. The completion of the circuit from line 134 to line 133 energizes a solenoid Sol 9 to open bleed valve 129. This reduces the pressure in the lefthand end of cylinder 115 causing piston 116 to move to the left, thus carrying the beam 71 to the left. If the finger 130 moves in the opposite direction, such as would be the case if fabric F travels too far to the left in FIG. 8, contact will be made between the arm 132 and contact 135 which completes a circuit between lines 134 and 136. Completion of the circuit from line 134 to 136 energizes solenoid Sol 10 to open bleed valve 128 reducing the pressure in the right end of cylinder 115 to move the shaft 110 of the beam to the right until finger 130 and arm 132 remain in a central or neutral position.

The edge control device described above is extremely effective and eliminates hunting and drifting. The fabric is maintained in alignment with the edge of platform 70 which is of especial importance in maintaining the accurate registry with the selvage opening sructure to be described more fully hereinafter.

Overrunning of the fabric feed is prevented by means of a tension device comprising a pulley 140 keyed to shaft 110 over which a friction strap 141 is trained. Strap 141 carries a weight 142 at one end, and is anchored at the other end to anchor bracket 143 secured to piston rod 114.

Additional means for insuring proper fabric feed across platform 70 and over roller 98 may be seen in FIGS. 2 and 4 which show a series of pressure wipers or blades 145, 145 loosely suspended from frame member 146 by means of an angle bracket 147 and a bolt 148. The arcuate blades 145 may be provided with weights 149, 149 as may be found desirable or effective to smooth the pleated fabric and to maintain it in proper feeding relationship from selvage to selvage. Additional expedients which may be used to relatively control the rate of feed of the selvages with respect to the center portion of the fabric are shown in FIG. 6 in which the terminal portions of roller 86 are provided with enlarged peripheries 150, 150 which feed the selvages somewhat faster than the central portion of the fabric F. Such devices for straightening and maintaining alignment of the pleats are helpful in preventing the shuttle from feeding through a pleat or puckering the fabric on insertion.

*Fabric and shuttle actuating mechanism*

As the fabric F continues to feed over the platform 70, the individual pockets P become sequentially aligned with the loading station as seen in FIG. 29, as well as the magazine 80. When each of the pleats is in proper registry with the shuttle 151, the driving means for the fabric momentarily stops. The shuttle advances through the empty pleat P to extract the bottom felt from magazine 80 and pull the felt back through the pleat with the shuttle, whereupon the shuttle continues to retract after the felt is retained in the fabric pleat.

The driving mechanism for advancing the fabric F as shown in FIGS. 5 and 6 and briefly described above will now be covered in conjunction with the shuttle operating mechanism.

Referring now to FIGS. 10–18, the bifurcated shuttle 151 has an upper tine or blade 151*a* and a lower tine or blade section 151*b* secured together at the righthand or trailing end by riveting or welding. A nose portion 155 is secured to the tip of the upper tine 151*a* and is preferably formed of a magnetically conductive material for rendering the tip susceptible to control by magnetic devices as will be described more fully hereinafter. The configuration of the tines 151*a* and 151*b* has been carefully chosen to retain the individual felts between the tines and also to facilitate withdrawal of the felt retaining needles after the felt strips have been properly positioned in the fabric. FIGURE 15 shows the beveled edges 156, 156 which greatly assist in retaining each felt strip S thereby preventing it from slipping sideways out of the shuttle 151. These beveled edges 156 extend through the length of the shuttle 151 on the back side thereof, and on the front side of lower tine 151*b*. The edge of upper tine 151*a* flares up as shown at 157 (FIG. 16). This facilitates the access of the felt strip retaining means which penetrate the strip through the fabric pocket when the strip has been properly positioned in each pleat. The shuttle tines 151*a* and 151*b* are shown as riveted together at 158 (FIG. 14) and secured to a link 159 hinged at 160 to the mating hinge element 161 on the shuttle. The link 159 rides on the guide track 162 and on a roller 163 journaled in a post 164. The outer end of the link 159 is secured to a block or post 165 which extends upwardly through the slot in track 162 as shown more clearly in FIGURE 12. Actuation of the shuttle is achieved by means of telescopic pneumatic cylinders 166 and 167 (FIGS. 2, 3, and 10) the latter of which is tied to the piston rod 168 of cylinder 166 so that the full stroke of each piston in cylinders 166, 167 is imparted to the post 165 through the carrier 170 which is supported in box channel tracks 171 and 172 on rollers 173 and 174. The piston rod 168 of cylinder 166 is adjustably secured to block 170 by means of nuts 175 and 176. Cylinder 166 is also movable with respect to the box track 171, 172 being supported in two carriers 177 and 178 suspended from rollers 179 and 180. The cylinder 167 is secured to the piston rod 181 by means of an adjustable connection and lock nut 182. Cylinder 167 is anchored to the framework and suitable fluid connections to be described hereinafter are made to each of the cylinders so that the full double stroke of both cylinders is imparted to the movement of the shuttle 151.

*Selvage control and pleat opener*

Reciprocation of the shuttle 151 back and forth across platform 70 and through one of the various pleats or pockets constitutes the stuffing operation performed by the present apparatus. It is of importance to make sure that the fabric pockets are properly registered with the shuttle and also to insure that the selvages of the fabric on the shuttle entering side are under proper control to prevent misalignment with the shuttle thereby causing buckling or damage to the fabric.

An important feature of the invention resides in the continuous ability to open the selvage of the fabric F through which the shuttle 151 is to be inserted. Referring to FIGURES 20–26, 27 and 28, pleats are formed by parallel rows of interweaving threads 185, 185 which rows terminate substantially short of the near selvage edge 186 of fabric F. The fabric F is intermittently advanced so that unfilled pockets or pleats P are successively registered with the track assembly 83 for the shuttle 151. When properly registered with the shuttle, the selvage is open to receive the shuttle into the pockets, during which time the fabric is securely clamped in place to prevent misalignment and to insure proper penetration of the shuttle into each pocket.

As the fabric travels over the platform 70, the upper selvage F1 is carried through a thread cutter assembly 187 (FIG. 23) and over a cutter 188 which may be a razor blade secured to the platform 70 by means of a bolt 189. The lower selvage edge F2 runs underneath the cutter 188 as well as a suitable stepped guard or shield 190 secured to the platform by means of a bolt 191. The cutter assembly 187 insures that any threads accidentally joining selvages F1 and F2 are cleared so that each pocket is properly opened as it is successively presented to the shuttle loading station.

After passing through the cutter assembly 187, the upper selvage F1 passes over a wire guide 193 secured to platform 70 by bolts 194, 194. The guide 193 serves to maintain control of the selvages F1 and F2 until they respectively pass over and under a pair of openers 195 and 196 which are secured to platform 70 by bolts 197, 197 (FIG. 27). The leading opener 195 (FIG. 28) is provided with a tapered sloping face 198 which carries the upper selvage ply F1 to an elevated position such as shown in FIGURE 27. The lower ply F2 passes underneath the tapered portion 198 of the opener 195 and likewise underneath the allochiral tapered portion 199 of opener 196. The openers define and separate the selvage edges between which the shuttle is projected to enter each separate pleat or pocket P.

*Near selvage clamping mechanism*

Referring now to FIGURES 20, 24, and 26, the near selvage clamp assembly 200 comprises a bar 201 mounted to oscillate vertically by means of guide rods 202 and 203 which slide in the horizontal subframe members 204 and 205. Guide rods 202 and 203 are secured to the bar 201 by means of nuts 206, 206. A clamping pad 207 is suspended beneath each of the rods 202 and 203 and the pads may be provided with soft or resilient faces 208 to prevent damaging the fabric F. The bar 201 is also provided with a pair of needles 209, 209 which penetrate the fabric and prevent buckling or gathering due to the friction between the fabric and the entering shuttle. Clamp bar 201 is controlled in its vertical oscillation by means of an air cylinder 210 and an electro-magnetic valve 211 actuated by solenoid S11 (FIG. 20). As the fabric F advances to present an empty pleat or pocket to the shuttle, it is guided over the openers 195 and 196 to the position shown generally in FIGURE 24. The sensing arm 212, having a roller 213, drops between two filled pockets and thereby controls the stopping circuit to the main motor as will be described more fully in conjunction with the electric circuit. With the fabric stopped, as shown in FIGURE 24, the bar 201 is forced downwardly by cylinder 210 to impale the fabric with needles 209, 209. Further downward movement of the clamp bar also clamps and retains the now fully opened pocket around the openers 195 and 196 as shown in FIGURES 26 and 27. The action of the clamps 207, 207 stretches the upper ply F1 of the selvage tightly across the tops of the openers, thus insuring that there will be no sag of the upper selvage F1 which might cause the shuttle nose to ride over the fabric instead of into the pocket.

Subframe members 204 and 205 are secured to a cross member 214 which is in turn mounted on horizontal frame members 215 and 216 and supported on a plurality of posts, two of which are shown at 217, 217 (FIG. 20). A bracket 218 extends from the horizontal member 216 and carries the edge sensing switch assembly 219 on which the edge sensing finger 130 is journaled.

The correlated action of the selvage openers 195, 196; the needles 209, 209, which extend through a pair of angle guide elements 220, 220 (FIG. 26); and clamps 207, 207 is shown clearly in FIGURES 26 and 29 and forms an important part of the invention in providing completely automatic operation of the machine. Positive entry of the shuttle nose 155 is assured due to the excellent edge control and guiding of the selvage on the shuttle entering side of the fabric. To further insure accurate aiming of the shuttle, I provided a heavy guide roller 221 journaled in brackets 222, 222 which also prevents the shuttle tip from striking or running over the upper selvage F1.

*Loading the shuttle*

After advancing through the pleat and reaching the opposite or far selvage of the fabric, the shuttle extracts the bottom felt 225 from the magazine 80 as shown in FIGURES 30–37. The mechanism for loading the bottom felt 225 between the tines 151*a* and 151*b* of the shuttle will be more fully described. A pair of magnets 226 and 227 are mounted in a supporting structure 228 between the loading end of magazine 80 and platform 70. As the magnetically responsive upper tip 155 of the shuttle passes under magnets 226 and 227, it is attracted thereby, and held in an elevated position, thus effecting the opening or separation of the upper tine 151*a* and the lower tine 151*b*. As the shuttle continues to advance, the tip 155 contacts a pivoting cam 229 (FIGURE 35) which has a pair of serrated fingers 230 and 231 that are urged into contact with the next-to-the-bottom felt 232. As the cam 229 continues to pivot on its axis 233, the forward ends of felt 232 together with all of those on the top of felt 232 in the magazine, are raised and supported to facilitate the stripping of the bottom felt 225 from the stack. This action is shown in FIGURE 37. The cam 229 continues to support the forward end of the stack of felts during the complete insertion of the shuttle into the stack and around the bottom felt 225. It will be noted that the forward wall 234 of the magazine is canted as shown in FIGURES 30 and 34 to facilitate separation of the individual felts and also to eliminate any binding thereof. A spring loaded false bottom 235 is also utilized to slightly elevate the leading edge of bottom felt 225 thereby permitting the tip of the lower tine 151*b* to have sufficient clearance to get under felt 225 as shown in FIGURE 37. The false bottom 235 extends upwardly through a gap in the bottom or floor 236 of the magazine and is attached to the floor 236 by means of riveting at 237. Upon complete penetration of the shuttle through the magazine 80, the control mechanism for the shuttle is reversed to retract the shuttle through the pleat in the fabric together with the bottom felt strip 225. As the tip 155 of the receding shuttle clears cam 229, the cam pivots in a counter-clockwise direction, thus permitting all of the felts in the magazine to drop one thickness.

Referring to FIGURES 30–33, the magazine 80 comprises a base member 236 to which a series of upright posts 238, 238 are secured in lateral spaced relation to accommodate a stack of the felt stuffer strips S. The forward abutment or end wall 234 slopes to prevent vertical registry of the forward ends of the felts S in order to facilitate separation of each bottom felt from the stack thus preventing binding. As the shuttle advances underneath the stack of felts in the magazine, the entire stack moves backwardly in the direction of shuttle movement to a slight degree. Then as the shuttle reverses direction and is withdrawn, the entire stack is moved forwardly into snug contact with the forward wall 234. This back and forth movement of the felts in the magazine against the canted forward wall greatly assists in preventing undesired adhesion between the individual strips. The base 236 of the magazine floats in the channel brackets 241, 242 secured to a horizontal beam 243 so that it will automatically align itself with the shuttle during the stripping of the bottom felt. The rear part of base 236 is maintained upon a rod 244 (FIGURE 33) which is secured in the bracket 241 and in turn secured to beam 243 (FIGURE 33). The base 236 is biased to a center position on rod 244 by means of compression springs 245, 245. The opposite end of the base 236 of the magazine is similarly mounted on a rod 246 secured to bracket 242 and spring biased to a central position by means of springs 248, 248. Flared guide blades 249 and 250 are secured to the righthand or entering position of the base 236 to assist in guiding the entry of the shuttle into the magazine. Any minor inaccuracies in registration are readily compensated by means of the floating action of the magazine 80 as the shuttle advances into the magazine or, strictly speaking, the magazine is capable of adjusting its position to receive the shuttle without damage and undue wear.

In addition to the action of the cam 229, described above, I also utilize a pair of oppositely facing needles 251 and 252 (FIGURE 32) spring loaded at 253 and 254 and actuated by means of solenoids Sol 2 and Sol 3. These solenoids and their associated brackets are mounted on base member 236 (FIGURE 32). The needles 251 and 252 are advanced to hold the next-to-the-bottom felt 232 during the stripping of the bottom felt 225 from the stack and also during withdrawal of the shuttle. After the bottom felt has been completely stripped from the stack, needles 251 and 252 are retracted, as will be more fully described hereinafter, thus permitting the stack to drop.

*Detecting switches for fabric registry and shuttle malfunction*

Referring now to FIGURES 38–40, I provide a plurality of sensing elements and electrical circuits for providing accurate registry and intermittent movement of the fabric F as well as emergency stop devices to open various circuits in the event of a malfunction and also to insure registry of the pleats. Pivoting finger 212, provided with roller 213, rides over the filled pleats or pockets of fabric F. The diameter of roller 213 is such that it will drop in between adjacent pockets to provide sufficient movement for arm 212 to actuate a switch S14. When the roller 213 drops between adjacent filled pockets, the main motor 91 is stopped and brake 96 is applied through solenoid 97. A second feeler arm 260 suspended from a switch S13 is provided with a roller 261 which rides along the needle of the next unfilled pleat or pocket. When the shuttle enters the pocket, arm 260 is raised, thus actuating switch S13 and conditioning the circuits for continuation of the stuffing cycle. A safety knock-off arm 262 is suspended from a pivoting arm 263 that extends laterally over the filling station where the last pocket is being stuffed. Arm 263 is suspended from brackets 264 and positioned to actuate a switch S19 when the arm pivots in the brackets. Such pivoting would be caused by a puckering of the fabric, should the shuttle fail to enter the pocket smoothly. This condition is shown in FIGURE 63. Should the shuttle completely pass over the fabric, it would then pick up the extension 262, also actuating switch S19. The functioning of switches S13, S14, and S19 will be explained in connection with the description of the circuitry.

*Fabric control mechanism for far selvage of fabric*

After the shuttle has picked up or stripped the bottom felt 225, it is withdrawn through the pocket together with the felt. When the felt has been properly positioned in the pleat, a pair of cylinders 265 and 266 (FIGS. 41 and 42) are actuated to depress a bar 267 which carries a pair of fabric clamps 268, 268 having soft faces or pads 269, 269. These pads are kept in contact with the fabric during withdrawal of the shuttle. This clamping feature prevents any undesired movement or misalignment at the far selvage and thereby insure that the shuttle has a substantially straight passage through each pocket. It will be noted that the righthand pressure pad 268, as seen in FIG. 41, is somewhat shorter than the lefthand pad since it contacts filled pleats, whereas pad 269 presses the second unfilled pocket against the platform. As the shuttle withdraws, cylinder 270 is actuated to depress the center pressure pad 271 against the filled pocket and particularly the trail of the felt which extends beyond the tines 151*a* and 151*b*. Depression of pressure pad 271 also actuates switch S16 (FIG. 42) through rod or bar 272 as will be more fully described hereinafter. The cylinders 265, 266, and 270 are mounted on a frame member 275 supported on upright posts 276, 276 and connected transversely across the machine to the frame members 146 and 216.

*The felt anchoring needle bar*

As soon as the shuttle has retracted to position the felt in the pocket being filled and the center pressure pad 271 has been actuated, a needle bar 277 journaled in bearings 278, 278 (FIGS. 43–45) swings from the dotted line position shown in FIGURE 44. Needle bar 277 also carries a leg 279 which is positioned over the empty pleat during the insertion of the shuttle. This helps to maintain proper control of the pleat and shuttle until the felt is fully positioned in the pleat. After needle bar pivots in bearings 278, the leg 279 is displaced as shown in FIGURE 44, and the felt is anchored in place by means of a series of needles 280, 280 secured in posts 281, 281 adjustably mounted in the needle bar 277. The needle bar is actuated by means of a cylinder 282 having a piston rod 283 connected to a lever 284 on the bar 277 (FIG. 44). The cylinder is controlled by means of solenoid Sol 8. The anchoring or impaling of the felt in the pocket by means of needles 280 assures that the felt always remains in the pocket at the proper place and is not carried out with the shuttle beyond the leading edge of the fabric. It will be noted that the punctures made by needles 280 are immaterial because they are located in the back of the fabric. Furthermore, the needles pierce the fabric and felts in the direction of movement so that, in the event they should fail to release when the fabric is advancing, they will automatically be extracted from the felt by the fabric movement.

*Operation and circuitry*

Referring to FIGURES 46–63, the cycle of operation for the fully automatic as well as the semi-automatic functions of the stuffing machine will be described. Preliminarily, the fabric F is positioned in the machine, preferably with a leader so that the first pleat to be filled registers with the shuttle track 83 at the near selvage and the felt magazine 80 at the far selvage. With the fabric thus positioned, the operator closes the main fuse disconnect switch S21 (FIG. 62) and then the master control switch S1 (FIG. 61). This conditions the various control circuits. One of these control circuits is completed to relay R5 through normally closed switches S10 and S20. Energization of relay R5 opens normally closed contacts R5*a*, thus preventing movement of the shuttle until near clamp bar 201 is in clamping position as seen in FIGS. 26 and 29.

For semi-automatic operation, switch S2 is turned to a "manual position" thereby closing contacts S2*b* and S2*d*. With the closing of these contacts, relay R1 is energized to close contacts R1*a*, R1*b*, and R1*c* (FIG. 62). This starts motor 91 and activates the 90 volt D.C. power supply for the motor brake solenoid 97 and the clutch 92 in the fabric advancing mechanism. At this stage the various moving parts of the stuffing machine are in the relative positions shown in FIGS. 40, 46, 47, and 55.

Figures 46, 47, 48, 49, 50, 51, 52, 53:
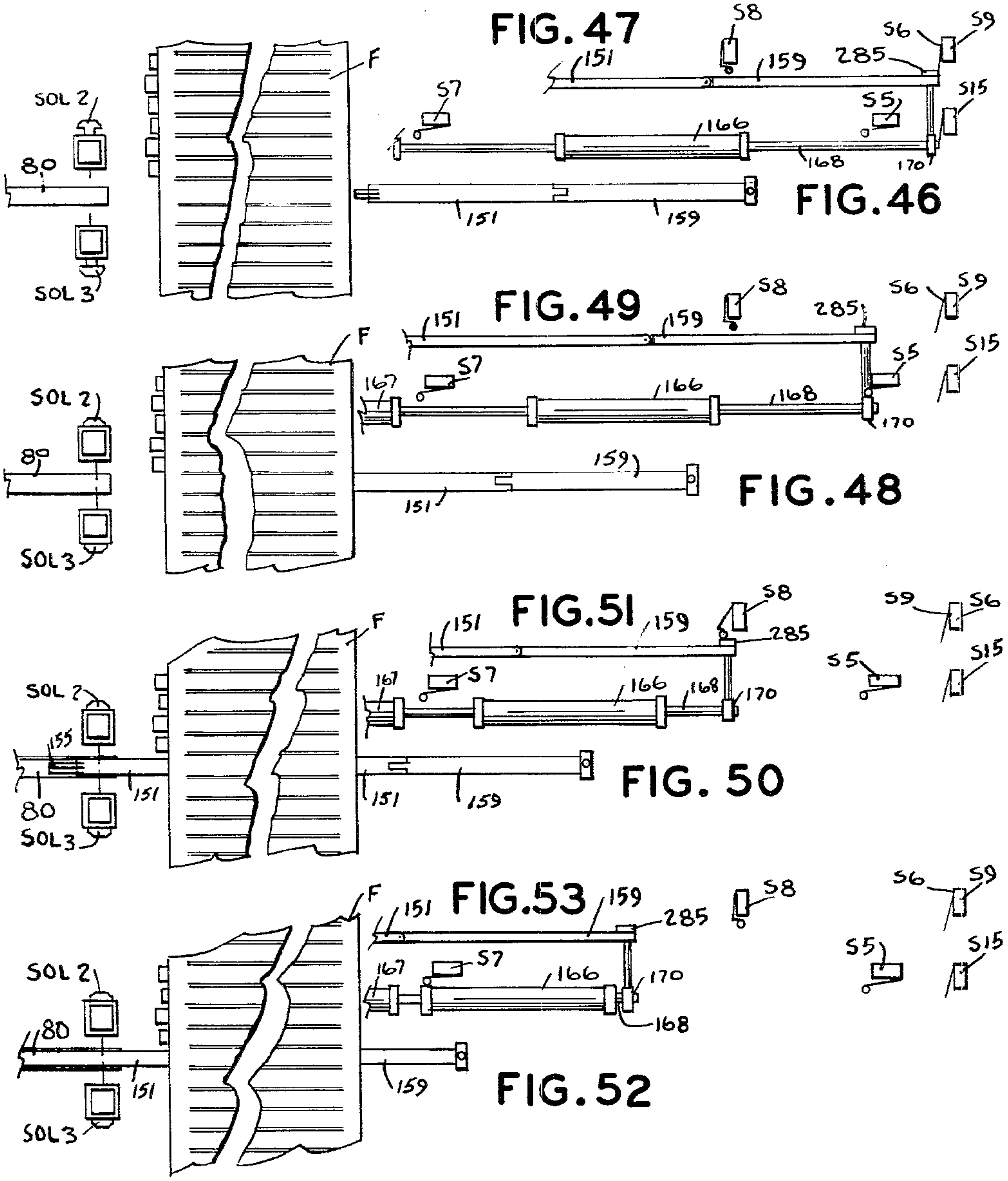
Figures 55, 56, 57, 58, 59:
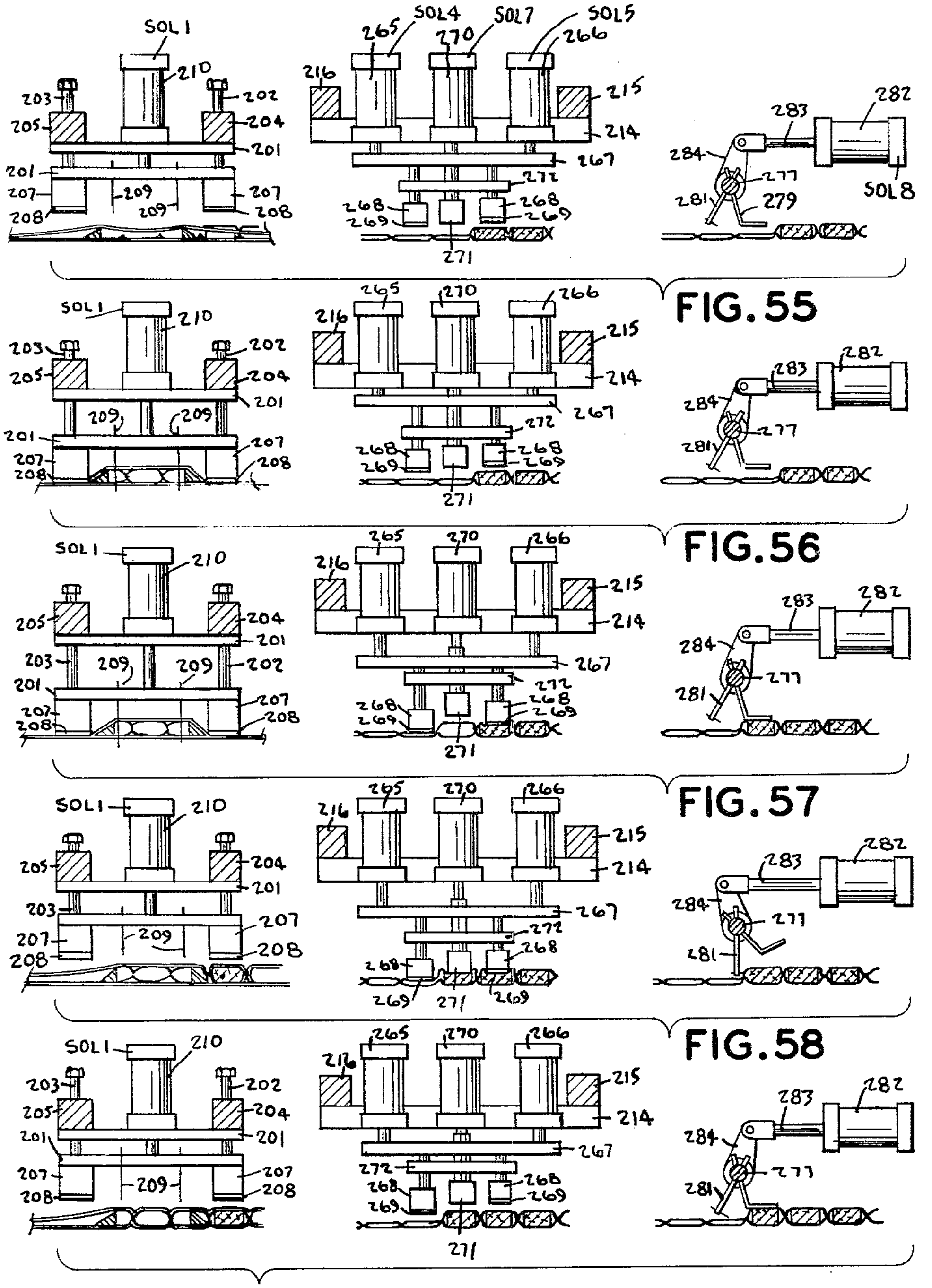

The operator then presses and holds the "IN" push button switch S3 to energize solenoids Sol 1, Sol 11, and Sol 12 through closed relay contacts R6*a*. Energization of solenoid Sol 1 activates cylinder 210 to close the near fabric clamp from the position shown in FIGS. 24 and 55 to the position shown in FIGS. 26 and 56. When the near fabric clamp is actuated, switches S10 and S20 open to break the circuit to relay R5, thus closing contacts R5*a*. Energization of solenoids Sol 11 and Sol 12 projects the felt strip hold needles 251 and 252 to the position shown in FIG. 48. As described previously, these needles penetrate the next-to-the-bottom felt strip and maintain the strips in the stack in the desired relationship. In addition to the above functions, closing of switch S3 also energizes relay R3 through normally closed contacts of switch S6 which is located on the outermost portion of the track assembly 83. When relay R3 is energized, it is maintained in this condition through a holding circuit leading through contacts R3*a* and normally closed switch S7 positioned at the innermost point of travel for cylinder 166. Also, relay contacts R3*b* are opened to lock out all of the reversing circuits. Contacts R3*c* are opened to lock out the fabric advancing circuits. With the closing of switch S3 and the actuation of clamp bar 201, solenoid Sol 2 is energized through closed contacts R6*a* and R5*a* of de-energized relays 6 and 5 respectively. Energization of solenoid Sol 2 initiates forward movement of shuttle 151 by opening a valve in the fluid supply line 280 which supplies fluid pressure such as air to the righthand ends of cylinders 166 and 167, FIG. 60. The cylinders are interconnected end for end through flexible fluid lines 281 and 282. Actuation of solenoid Sol 2 introduces relatively low pressure fluid to the cylinders so that the initial six inches of shuttle travel takes place at comparatively slow speed. This is for the purpose of minimizing damage in the event that the shuttle fails to enter the pleat properly. After the shuttle travels approximately six inches, the carrier 170 on piston rod 168 momentarily contacts switch S5 as shown in FIGS. 48 and 49. Closing of switch S5 energizes solenoid Sol 3 through closed relay contacts R5*a* and R6*a*. Relay R2 is thus energized to provide a holding circuit for solenoid Sol 3 through relay contacts R2*a*. Solenoid Sol 3 operates a valve in a high pressure fluid line 283 (FIG. 60) which in turn introduces fluid, preferably air, at elevated pressure to the same righthand ends of cylinders 166 and 167. This introduction of high pressure fluid into the cylinders increases the shuttle speed to complete the insertion of the shuttle through the pleat at high speed. At approximately the same time that switch S5 is closed on the "IN" stroke, the shuttle also elevates contact arm 260 when it passes roller 261 in advancing through the pleat. This closes switch S13 in the circuit to relay R6. I provide two pressure safety switches S11 and S12 in each of the high and low pressure fluid lines so that, in the event excessive pressure develops, either during the low pressure or the high pressure "IN" or "OUT" cycle, the circuit to relay R5 will be completed, thus energizing relay R5, and opening contacts R5*a* to de-energize either solenoid Sol 2 or Sol 3 as the case may be. Relay contacts R2*b* in series with switch S12 cut this switch out during the operation of the high pressure portion of the cycle. This safety device is required in the event that some obstruction or other malfunction hinders the smooth and free movement of the shuttle in the pleat. As the shuttle continues to move into the pleat, a strike 285 on the shuttle extension passes switch S8 (FIG. 51) but no effect on the circuit is caused because switch S8 is normally open and contact with switch S8 when the shuttle enters the fabric merely maintains switch S8 in its already open condition. FIGURES 50, 51, and 56 show the relative position of the elements during the high pressure portion of the shuttle insertion cycle. The shuttle continues to the end of its stroke whereupon the edge of cylinder 166 momentarily opens limit switch S7 (FIG. 53). This causes relay R3 to drop out. Switch S6 is normally open but held closed only when the shuttle is fully out so that S6 at this time is now open by virtue of the initial movement of the shuttle extension 159, FIGS. 52 and 53. This completes the in cycle in the semi-automatic operation. The operator then releases the "IN" push button S33.

To initiate the out or withdrawal cycle for the shuttle, when swich S3 is open, solenoids Sol 1, Sol 2, Sol 3, Sol 11, and Sol 12 are all de-energized if not previously de-energized. With the de-energization of solenoid Sol 1, relay R5 is pulled in because switches S10 and S20 close when the front fabric clamp is released. The operator now presses the "OUT" push button switch S4. This energizes solenoids Sol 4 and Sol 5 through normally closed contacts R3*b* and R6*b*. Note that relay R3 and R6 are both de-energized. Relay R3 was de-energized when switch S3 was released. Relay R6 is de-energized because switch S15 is open although switch S13 and relay contacts R3*c* are closed. As the far fabric clamping cylinders 265 and 266 depress the clamping bar 267, a switch S16 (FIG. 42) is closed by bar 272. This in turn energizes solenoid Sol 6 (FIG. 60) to vent the righthand ends of cylinders 166 and 167 and introduce high pressure air to the lefthand ends thus initiating the withdrawal stroke for the shuttle. As the shuttle continues to withdraw, strike 285 closes switch S8 as shown in FIG. 54 which energizes solenoids Sol 7 and Sol 8 and relay R4 through normally closed, held open, switch S9. Relay R4 is held in through its own contacts R4*a*. Solenoid Sol 7 actuates the center clamp 271 through cylinder 270 to clamp the tail of the felt which exceeds somewhat beyond the nose of the shuttle. Solenoid Sol 8 operates cylinder 282 to swing the needle retaining pin bar 277 into the felt engaging position shown in FIGS. 45 and 58. In the full line or downwardly pivoted position of FIGURE 45 the needles 280 penetrate the fabric F and pierce the felt strip S that is in the shuttle. It will be understood that the location of switch S8 is such that the felt anchoring function occurs only when the felt has been drawn to the proper position in the pleat by the shuttle. With the felt securely anchored in the pleat by reason of clamp 271 and needles 280, 280 the shuttle continues to withdraw until it strikes switch S15 which is positioned on the track assembly 83 approximately ¼ inch in advance of the full out shuttle station. This closes switch S15 which is normally open but held closed only when the shuttle is fully retracted. Closing of switch S15 energizes relay R6 thus opening normally closed contacts R6*a* and opens all the inserting circuits even though the in switch S3 should be closed. Simultaneously with the opening of relay contacts R6*b*, solenoids Sol 4 and Sol 5 are de-energized thus releasing the far fabric clamps 268, 268. Releasing of the far fabric clamps in turn opens switch S16 to de-energize solenoids Sol 6, Sol 7, and Sol 8 as well as relay R4. This resets solenoid Sol 6 for the insertion stroke, releases the felt clamp 271, and the pin bar 277. With the closing of relay contacts R6*c*, relays R7 and R8 are energized to engage clutch 92 and release brake solenoid 97 which connects motor 91 thus advancing the fabric across platform 70. As the fabric starts to advance, roller 213 rides up over the next succeeding pleat (FIG. 39). This raising of the contact arm 212 closes switch S14. Likewise, roller 261 moves longitudinally from the last filled pleat until it drops from this pleat as also shown in FIG. 39. Switch S13 opens when the contact arm 260 drops, but switch S14 maintains the closed circuit to relays R7 and R8 until roller 213 drops into the next succeeding valley between filled pleats as shown in FIG. 40. At this point the circuit to relays R6, R7, and R8 are open thus resetting solenoid brake 97 and disengaging clutch 92. Simultaneously with the de-energization of the relay R6 the start circuits to solenoids Sol 1, Sol 2, Sol 3, Sol 11, and Sol 12 are conditioned. This completes the semi-automatic in and out cycles for the shuttle.

For completely automatic operation, the operator turns switch S2 to the automatic position which closes switch contacts S2*a*, S2*c*, and S2*e*. Contacts S2*a* operate relays R1 in the same manner as described above. Contacts S2*c* operate solenoids Sol 1, Sol 2, Sol 3, Sol 11, Sol 12 and relays R2 and R3 as described above since contacts S2*c* merely bridge switch S3. Contacts S2*e* bypass switch S4 with the result that manual operation of switch S3 and S4 is simply eliminated.

Relay R5 is in the circuit to protect the shuttle from damage if a malfunction occurs during the inserting cycle. It controls the inserting cycle through contact R5*a* which shuts off the air pressure to the cylinders through solenoids Sol 2 and Sol 3. Relay R5 is controlled by 5 switches. Closing of switch S19 stops the machine if the fabric is buckled or puckered by the shuttle. Switches S10 and S20 stop operation if the clamps are not in place. Switch S11 shuts off the circuit if the air exceeds a predetermined pressure during the face inserting cycle. Switch S12 performs the same function as S11 except during the low pressure cycle and relay R2*b* cuts operation of S12 during the high pressure cycle.

This completes the description of the fabric pleat stuffing machine together with the control circuits which render it completely automatic.

It will thus be understood that I have devised a vastly improved stuffing machine for filling the pleats of corrugated material from a supply of filler. The invention has been described in connection with the filling of pleats in a woven textile fabric. Further treatment of the fabric may be employed to present a smooth back in the event that thermoplastic fibers are used in one of the plies. This treatment does not form a part of the present invent but, with the addition of appropriate heat, certain of the fibers may be contacted so that a substantially smooth back is achieved. Furthermore, the apparatus may be used to fill pockets in non-woven material or sheeting and the material which is to be inserted may be any one of a variety of items such as foam or sponge rubber, protective strips such as armor, heat and/or cold reflective material and the like. The materials for both the pleats and the stuffing may be natural or synthetic.

Having thus described my invention, I claim:

1. In a device for filling transverse pockets in a multiply material, the combination which comprises a table over which the material is advanced, means for intermittently advancing the material across the table to register successive pockets with a filling station, a supply of filling material at one side of the table in line with said station, a shuttle positioned at the opposite side of the table in line with the filling station, means for cyclically advancing the shuttle through a pocket into the filling station, and means for retracting the shuttle and filling through the pocket.

2. Apparatus in accordance with claim 1 in which the filling station comprises a floating base and a canted forward wall.

3. Apparatus in accordance with claim 2 in which the station is provided with a pair of needles for cyclically engaging a lower filling element in the station.

4. Apparatus in accordance with claim 1 in which the shuttle comprises a bifurcated element actuated by at least one fluid cylinder.

5. Apparatus in accordance with claim 4 in which the shuttle is provided with a magnetically attractive element on one of the bifurcations.

6. Apparatus in accordance with claim 2 in which the shuttle is bifurcated and provided with an upper portion and a lower portion, and means including a magnet positioned adjacent the canted wall for attracting the upper portion of the shuttle as it passes thereunder thereby maintaining said upper portion in an elevated position during insertion into the filling station.

7. Apparatus in accordance with claim 2 having a pivoted cam positioned adjacent the canted wall and actuated by the shuttle for separating portions of the material in the filling station during entry of the shuttle.

8. Apparatus in accordance with claim 4 in which the filling station has false spring loaded bottom for guiding one bifurcation of the shuttle as it enters the filling station.

9. Apparatus in accordance with claim 1 having a front clamp assembly positioned to secure the material for registry with the shuttle.

10. Apparatus in accordance with claim 9 having a pair of material openers secured to the platform adjacent the clamp for separating and guiding the material edges at the shuttle insertion station.

11. Apparatus in accordance with claim 9 in which the clamp is provided with at least one material penetrating needle.

12. Apparatus in accordance with claim 1 having a far fabric clamp positioned adjacent the far edge of the material in line with the filling station.

13. Apparatus in accordance with claim 12 having a filling clamp positioned at the far material edge adjacent the filling station.

14. Apparatus in accordance with claim 1 having a pivoting needle bar mounted over the table in spaced relation to a pocket in registry with the filling station, and means for pivoting said needle bar to anchor the filling in said pocket.

15. Apparatus in accordance with claim 1 having means for guiding the edge of the material in a substantially linear path across the table.

16. In an automatic pocket stuffing machine and the like, the combination which comprises a shuttle movable into a pocket of material to be stuffed; means for advancing the shuttle into and retracting the shuttle out of said pocket; a material clamp positioned adjacent the near edge of the material; means for actuating said clamp; a second clamp positioned adjacent the far edge of the material; means for actuating said second clamp; a filling clamp associated with said second clamp; means for actuating said filling clamp; anchoring means mounted over the table and positioned to move from a retracted to an anchoring position; means for moving said anchoring means; means for advancing the material across the table in successive increments; a plurality of sensing elements positioned along the path of the shuttle; and electrical circuits connecting the sensing means, the actuating means for the clamps, and the anchoring means whereby the near clamp is actuated as the shuttle advances, the far clamp is actuated as the shuttle retracts, the near clamp is released when the shuttle retracts, and the filling clamp is actuated when the shuttle has positioned the filling in the pocket.

17. In apparatus for filling pockets in a material that is advanced in predetermined increments of travel, the subcombination which comprises a shuttle positioned adjacent one edge of the material and operative to be advanced through successive pockets in the material, power means for advancing the shuttle, a magazine at the opposite edge of the material and in registry with the shuttle said magazine having a supply of filler elements to be inserted into successive pockets, means associated with said magazine for delivering an individual filler element to the shuttle when it advances through the pocket, and means for retaining the filler element in the pocket as the shuttle withdraws completely from the pocket to permit registry of the next succeeding pocket to be filled.

18. Apparatus in accordance with claim 17 having power means for advancing the material in predetermined increments, and means actuated by the shuttle when in a fully retracted position to initiate said power means.

19. Apparatus in accordance with claim 17 having power means for advancing the material in predetermined increments, means actuated by the shuttle when in a fully retracted position to initiate said power means, and power actuated clamping means adjacent each edge of the material in registry with the pocket to be filled.

20. Apparatus in accordance with claim 18 in which the magazine is provided with a floating support.

21. Apparatus in accordance with claim 18 in which the magazine is provided with power actuated gripping means for retaining the stack of fillers.

22. Apparatus in accordance with claim 18 in which the shuttle is bifurcated, means for guiding the upper shuttle bifurcation into the stack of fillers in the magazine, means for guiding the lower shuttle bifurcation underneath the stack of fillers in the magazine whereby the bottom filler in the stack is inserted between the shuttle bifurcations, and means for separating the bottom filler from the remaining fillers in the magazine.

23. Apparatus in accordance with claim 22 in which the separating means comprises a U shaped pivoting fork actuated by the shuttle as it advances towards the magazine.

24. Apparatus in accordance with claim 22 in which one of the shuttle bifurcation guide means comprises a magnet.

25. Apparatus in accordance with claim 19 in which the material clamping means at the entering edge comprises a pair of fluid actuated clamps straddling the pocket to be filled, and a pair of needles for penetrating the material on either side of the pocket to be filled.

26. Apparatus in accordance with claim 25 having means positioned between the clamps for opening the mouth of the pocket.

27. Apparatus in accordance with claim 25 in which the opening means comprises a pair of allochiral sloped brackets.

28. Apparatus in accordance with claim 25 having a cutter positioned upstream of the material travel for severing undesired connections between the upper and lower plies of the material.

29. Apparatus in accordance with claim 18 having a pair of fluid cylinders for actuating the shuttle, and means mounted on one of said cylinders for intermediately supporting the shuttle when in its retracted position.

30. Apparatus in accordance with claim 19 in which the clamping means at the far edge of the material comprises a pair of clamps positioned to straddle the pocket being filled and thereby anchoring the edge of the fabric during retraction of the shuttle, means including a fluid cylinder for actuating said clamps, a filler clamp positioned between said material clamps for anchoring the tail of each filler in its pocket thereby permitting full retraction of the shuttle from the filled pocket, and means including a fluid cylinder for actuating the filler clamp.

31. Apparatus in accordance with claim 18 having means for maintaining transverse alignment of the pockets and means for preventing buckling of the pockets.

32. Apparatus in accordance with claim 16 including a malfunction detecting finger and electrical circuits for de-energizing the means for advancing the material in the event that the detecting finger is moved from a predetermined position.

33. Apparatus in accordance with claim 16 having lockout circuits to prevent inadvertent movement of the shuttle until the near clamping means has been actuated.

References Cited by the Examiner

UNITED STATES PATENTS

| | | | |
|---|---|---|---|
| 1,963,831 | 6/1934 | Coyne et al. | 53—260 XR |
| 3,124,918 | 3/1964 | Hall et al. | 53—125 |

TRAVIS S. McGEHEE, *Primary Examiner.*